US008504706B2

(12) United States Patent
Oe et al.

(10) Patent No.: US 8,504,706 B2
(45) Date of Patent: Aug. 6, 2013

(54) INFORMATION PROCESSING METHOD, APPARATUS, AND SYSTEM FOR CONTROLLING COMPUTER RESOURCES, CONTROL METHOD THEREFOR, STORAGE MEDIUM, AND PROGRAM

(75) Inventors: Naoyuki Oe, Tokyo (JP); Takahiro Shima, Tokyo (JP)

(73) Assignee: Humming Heads, Inc., Tokyo (JP)

( * ) Notice: Subject to any disclaimer, the term of this patent is extended or adjusted under 35 U.S.C. 154(b) by 256 days.

(21) Appl. No.: 12/580,407

(22) Filed: Oct. 16, 2009

(65) Prior Publication Data

US 2010/0064289 A1    Mar. 11, 2010

Related U.S. Application Data

(62) Division of application No. 09/988,106, filed on Nov. 19, 2001, now Pat. No. 7,607,131.

(30) Foreign Application Priority Data

| Nov. 20, 2000 | (JP) | 2000-352113 |
| Apr. 23, 2001 | (JP) | 2001-161403 |
| May 22, 2001 | (JP) | 2001-190445 |
| Oct. 19, 2001 | (JP) | 2001-322437 |

(51) Int. Cl.
*G06F 15/16*    (2006.01)
*G06F 15/173*   (2006.01)
*G06F 7/04*     (2006.01)

(52) U.S. Cl.
USPC .............................. 709/229; 709/225; 726/26

(58) Field of Classification Search
USPC ............. 709/225, 228, 229; 718/102; 726/26, 726/27, 30
See application file for complete search history.

(56) References Cited

U.S. PATENT DOCUMENTS

| 5,550,968 A | 8/1996 | Miller et al. .................. 395/157 |
| 5,809,230 A | 9/1998 | Pereira ........................... 395/186 |
| 5,870,467 A | 2/1999 | Imai et al. ........................ 380/4 |

(Continued)

FOREIGN PATENT DOCUMENTS

| JP | A 64-068835   | 3/1989 |
| JP | 5-134930 A    | 6/1993 |

(Continued)

OTHER PUBLICATIONS

Dorin Miller, "Security: Unix vs Mainframes. (Improving Unix Security with Mainframe Soft-Hooks Architecture)", Miller Freeman Inc., vol. 14, issue. 12, Nov. 1, 1996.

(Continued)

*Primary Examiner* — Brian J Gillis
(74) *Attorney, Agent, or Firm* — Fitzpatrick, Cella, Harper & Scinto

(57) ABSTRACT

An operation request from a process or OS for computer resource(s) managed by the OS, such as a file, network, storage device, display screen, or external device, is trapped before access to the computer resource. It is determined whether an access right for the computer resource designated by the trapped operation request is present. If the access right is present, the operation request is transferred to the operating system, and a result from the OS is returned to the request source process. If no access right is present, the operation request is denied, or the request is granted by charging in accordance with the contents of the computer resource.

4 Claims, 21 Drawing Sheets

U.S. PATENT DOCUMENTS

| | | | |
|---|---|---|---|
| 5,889,952 A * | 3/1999 | Hunnicutt et al. | 709/219 |
| 5,925,126 A | 7/1999 | Hsieh | |
| 5,956,715 A | 9/1999 | Glasser et al. | 707/9 |
| 6,023,586 A | 2/2000 | Gaisford et al. | |
| 6,041,411 A * | 3/2000 | Wyatt | 726/29 |
| 6,209,030 B1 | 3/2001 | Ohashi | |
| 6,308,173 B1 | 10/2001 | Glasser et al. | 707/9 |
| 6,381,331 B1 * | 4/2002 | Kato | 380/37 |
| 6,848,106 B1 * | 1/2005 | Hipp | 719/312 |
| 6,874,149 B1 | 3/2005 | Bermudez et al. | |
| 6,920,475 B1 * | 7/2005 | Klots et al. | 709/201 |
| 6,971,023 B1 | 11/2005 | Makinson et al. | 713/193 |
| 7,035,910 B1 | 4/2006 | Dutta et al. | 709/217 |
| 7,136,903 B1 * | 11/2006 | Phillips et al. | 709/217 |
| 7,484,245 B1 | 1/2009 | Friedman et al. | |
| 2002/0133710 A1 | 9/2002 | Tarbotton et al. | 713/188 |
| 2002/0194485 A1 * | 12/2002 | Ram et al. | 713/193 |
| 2003/0018918 A1 | 1/2003 | Natsuno et al. | 713/201 |
| 2003/0028653 A1 | 2/2003 | New et al. | 709/229 |

FOREIGN PATENT DOCUMENTS

| | | |
|---|---|---|
| JP | A 06-230844 | 8/1994 |
| JP | A 08-087440 | 4/1996 |
| JP | A 08-137733 | 5/1996 |
| JP | A 08-314786 | 11/1996 |
| JP | 9-62627 A | 3/1997 |
| JP | A 10-154184 | 6/1998 |
| JP | A 10-254840 | 9/1998 |
| JP | A 11-219320 | 8/1999 |
| JP | 11-296336 A | 10/1999 |
| JP | 2000-29845 A | 1/2000 |
| JP | 2000-112890 A | 4/2000 |
| JP | A 2001-202279 | 7/2001 |
| JP | A 2001-312286 | 11/2001 |

OTHER PUBLICATIONS

Dorin Miller, "Security: Unix vs Mainframes", UNIX Magazine, ASCII Corporation, vol. 12, No. 4, p. 115-119, Apr. 1, 1997.

U.S. Patent and Trademark Office, Office Action dated Apr. 18, 2012, in connection with U.S. Appl. No. 12/580,425 (13 pages).

Japan Patent Office, Office Action dated Jun. 29, 2012, in connection with Japan Patent Application No. 2011-057067 (2 pages) (a partial English translation thereof is attached thereto).

* cited by examiner

FIG. 3

ACCESS RIGHT MANAGEMENT TABLE 2035

| 20351 | 20352 | 20353 | ... | 2035n |
|---|---|---|---|---|
| RESOURCE DESIGNATION INFORMATION A | CONDITION A | ACCESS RIGHT INFORMATION A1 | ... | ACCESS RIGHT INFORMATION An |
| RESOURCE DESIGNATION INFORMATION B | CONDITION B | ACCESS RIGHT INFORMATION B1 | ... | ACCESS RIGHT INFORMATION Bn |
| RESOURCE DESIGNATION INFORMATION C | CONDITION C | ACCESS RIGHT INFORMATION C1 | ... | ACCESS RIGHT INFORMATION Cn |
| ... | ... | ... | | ... |

FIG. 8

ACCESS MONITOR LOG

FILE(F)　EDIT(E)　OPTION(O)　HELP(H)

ALL FILES | FILES WITH RIGHT

| FILE NAME | USER | OPERATION | ACTION | ACCESS DATE/TIME | LOCATION |
|---|---|---|---|---|---|
| CONFIDENTIAL DOCUMENT | John | FILE UPDATE | GRANT | 00/01/01 0:00 | ¥¥GENERAL AFFAIRS |
| CUSTOMER LIST | Smith | PRINT | DENIAL | 00/01/01 0:00 | ¥¥SALES |
| DEVELOPMENT SOURCE | Michel | FILE COPY | FAILURE | 00/01/01 0:00 | ¥¥DEVELOPMENT |
| PROGRESS TABLE | Anne | DOCUMENT CONTENTS COPY | SUCCESSFUL | 00/01/01 0:00 | ¥¥PLANNING |
| ASSESSING TABLE | Bob | ATTACH TO MAIL | DENIAL | 00/01/01 0:00 | ¥¥PERSONNEL |
| FINANCIAL REPORT | Ken | SCREEN CAPTURE | GRANT | 00/01/01 0:00 | ¥¥FINANCE |
| COMPANY GUIDE | Nancy | FILE MOVE | FAILURE | 00/01/01 0:00 | ¥¥SALES |
| ORGANIZATION DIAGRAM | | | | | ¥¥GENERAL AFFAIRS |

Smith WHO HAD NO RIGHT MADE ATTEMPT TO PRINT CUSTOMER LIST, AND IT WAS DENIED.

SECOND EMBODIMENT

FIG. 13A  PROTECTED DIGITAL INFORMATION
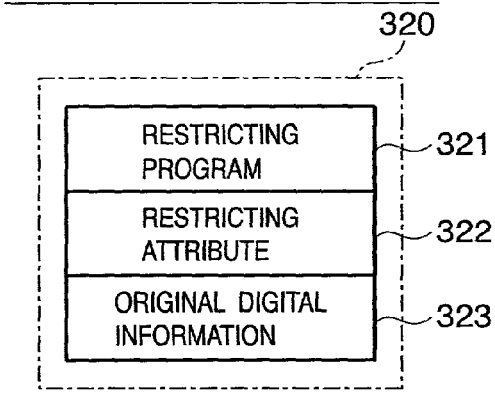
FIG. 13B  RESTRICTING PROGRAM
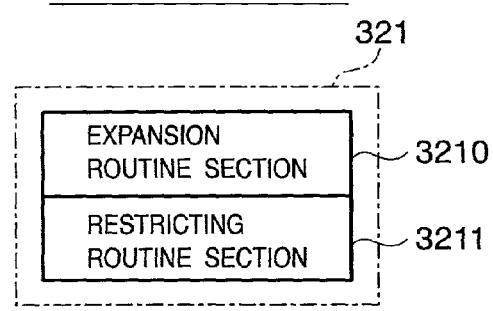
FIG. 13C  RESTRICTING ATTRIBUTE
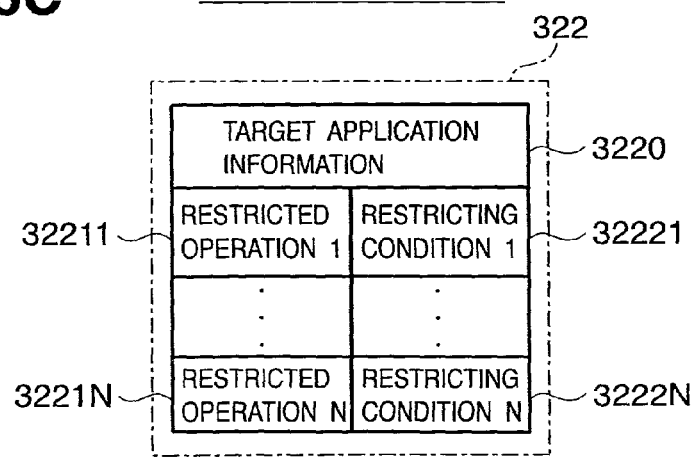

INFORMATION PROCESSING METHOD, APPARATUS, AND SYSTEM FOR CONTROLLING COMPUTER RESOURCES, CONTROL METHOD THEREFOR, STORAGE MEDIUM, AND PROGRAM

CROSS REFERENCE TO RELATED APPLICATION

This application is a division of U.S. patent application Ser. No. 09/988,106 filed Nov. 19, 2001, the entire disclosure of which is incorporated by reference herein.

FIELD OF THE INVENTION

The present invention relates to a computer resource control method and apparatus which manage access to computer resources such as a file, storage device, display screen, or external accessory device, and a storage medium.

BACKGROUND OF THE INVENTION

Conventionally, to prevent a user who has no access right from decoding or tapping information by making access to a resource such as a file or storage device in a computer such as a personal computer through an application program, a method of providing an access right check function in an operating system (to be referred to as an OS hereinafter) or a method of checking the access right by adding a dedicated access management tool is known.

For example, a general-purpose OS represented by Windows (registered trademark of Microsoft) has a function of inhibiting a user who has no access right from reading, writing, or executing a file. Some general-purpose OSs allow a user to set a right about deleting files, changing the access right, or changing ownership.

As an access management tool, a tool which registers the permission condition of file lookup and copy, then restricts file lookup and copy depending upon that permission condition is known, as disclosed in, e.g., Japanese Patent Laid-Open No. 7-84852. More specifically, a tool which adds a read restricting attribute to a display area to prevent capture of the display screen is known.

To completely inhibit a user from outputting information to some external medium, functions such as attachment to mail, printing, file move/file copy, copy to the clipboard, saving in removable medium such as a floppy disk, object paste, and screen capture must be restricted, as shown in FIG. 9. In addition, information output through a network must also be restricted.

In the prior art, however, operations other than file move/file copy and screen capture (e.g., copy to the clipboard) cannot be restricted. If operations such as copy to the clipboard should be restricted, the OS or application itself must be revised, and this makes versatile applicable use impossible.

SUMMARY OF THE INVENTION

It is an object of the present invention to provide an information processing apparatus and method which can control computer resources by making it possible to restrict operations to resources, including computer resources other than files and screen, by a user who has no access right and to extend inhibition or restricted items in an existing environment without revising the OS or process (program such as an application or demon that runs on the OS), and to provide a storage medium.

In order to achieve the above object, an information processing method according to the present invention has the following arrangement. That is, there is provided an information processing method of controlling access to computer resource(s) managed by an operating system, such as a file, network, storage device, display screen, or external device, comprising:

a trap step of trapping an operation request from a process or operating system for the computer resource before access to the computer resource;

a determination step of determining whether an access right for the computer resource designated by the operation request trapped in the trap step is present;

a processing step of, if it is determined in the determination step that the access right is present, transferring the operation request to the operating system and returning a result from the operating system to the request source process; and a denial step of denying the operation request if it is determined in the determination step that no access right is present.

In the trap step, the operation request from the process or operating system for the computer resource is preferably further trapped before access to the computer resource.

In the determination step, it is preferably determined whether the access right is present by looking up an access right management table containing resource designation information that designates a specific computer resource, condition information under which the access right is validated, and access right information that designates an access right that is extended but not defined in an existing environment.

In the determination step, it is preferably determined whether the access right is present by looking up access right information that is described in the computer resource to designate an access right that is extended but not defined in an existing environment.

In the determination step, it is preferably determined whether the access right is present by determining whether the access right can be acquired.

The access right information preferably contains information that designates at least one of a right to move to another medium, a right to copy in another medium, a right to print, a right to write in a shared memory, a right to capture a screen, and a right to run specific processes.

In the denial step, an access denial error message is preferably returned to the request source process without any access to the requested computer resource.

In the denial step, a successful access message is preferably returned to the request source process without any access to the requested computer resource.

In the denial step, preferably, the operation request is replaced to an operation request for a dummy computer resource and transferred to the operating system, and a result from the operating system is returned to the request source process.

In order to achieve the above object, an information processing apparatus according to the present invention has the following arrangement. That is, there is provided an information processing apparatus for controlling access to computer resource(s) managed by an operating system, such as a file, network, storage device, display screen, or external device, comprising:

trap means for trapping an operation request from a process or operating system for the computer resource before access to the computer resource;

determination means for determining whether an access right for the computer resource designated by the operation request trapped by the trap means is present;

processing means for, if it is determined by the determination means that the access right is present, transferring the operation request to the operating system and returning a result from the operating system to the request source process; and denial means for denying the operation request if it is determined by the determination means that no access right is present.

In order to achieve the above object, a storage medium according to the present invention has the following arrangement. That is, there is provided a storage medium which stores program codes for controlling access to computer resource(s) such as a file, network, storage device, display screen, or external device, comprising:

a program code of a trap step of trapping an operation request from a process or operating system for the computer resource before access to the computer resource;

a program code of a determination step of determining whether an access right for the computer resource designated by the operation request trapped in the trap step is present;

a program code of a processing step of, if it is determined in the determination step that the access right is present, transferring the operation request to the operating system and returning a result from the operating system to the request source process; and a program code of a denial step of denying the operation request if it is determined in the determination step that no access right is present.

In order to achieve the above object, a program according to the present invention has the following arrangement. That is, there is provided a program for causing a computer to control access to computer resource(s) such as a file, network, storage device, display screen, or external device, comprising:

a program code of a trap step of trapping an operation request from a process or operating system for the computer resource before access to the computer resource;

a program code of a determination step of determining whether an access right for the computer resource designated by the operation request trapped in the trap step is present;

a program code of a processing step of, if it is determined in the determination step that the access right is present, transferring the operation request to the operating system and returning a result from the operating system to the request source process; and a program code of a denial step of denying the operation request if it is determined in the determination step that no access right is present.

In order to achieve the above object, an information processing system according to the present invention has the following arrangement. That is, the first terminal comprises:

trap means for trapping an operation request from a process or operating system for computer resource(s) in the second terminal before access to the computer resource, and the second terminal comprises:

determination means for determining whether an access right for the computer resource designated by the operation request trapped by the trap means is present;

processing means for, if it is determined by the determination means that the access right is present, transferring the operation request to the operating system in the first terminal and returning a result from the operating system to the request source process; and denial means for denying the operation request if it is determined by the determination means that no access right is present.

In order to achieve the above object, a control method for an information processing system according to the present invention has the following arrangement. That is, there is provided a control method for an information processing system constituted by connecting first and second terminals through a communication network, comprising:

a trap step of, in the first terminal, trapping an operation request from a process or operating system for computer resource(s) in the second terminal before access to the computer resource;

a determination step of determining, in the second terminal, whether an access right for the computer resource designated by the operation request trapped in the trap step is present;

a processing step of, if it is determined in the determination step that the access right is present, transferring the operation request to the operating system in the first terminal and returning a result from the operating system to the request source process; and a denial step of denying the operation request if it is determined in the determination step that no access right is present.

In order to achieve the above object, a storage medium according to the present invention has the following arrangement. That is, there is provided a storage medium which stores program codes of control for an information processing system constituted by connecting first and second terminals through a communication network, comprising:

a program code of a trap step of, in the first terminal, trapping an operation request from a process or operating system for computer resource(s) in the second terminal before access to the computer resource;

a program code of a determination step of determining, in the second terminal, whether an access right for the computer resource designated by the operation request trapped in the trap step is present;

a program code of a processing step of, if it is determined in the determination step that the access right is present, transferring the operation request to the operating system in the first terminal and returning a result from the operating system to the request source process; and a program code of a denial step of denying the operation request if it is determined in the determination step that no access right is present.

In order to achieve the above object, a program according to the present invention has the following arrangement. That is, there is provided a program which causes a computer to control an information processing system constituted by connecting first and second terminals through a communication network, comprising:

a program code of a trap step of, in the first terminal, trapping an operation request from a process or operating system for computer resource(s) in the second terminal before access to the computer resource;

a program code of a determination step of determining, in the second terminal, whether an access right for the computer resource designated by the operation request trapped in the trap step is present;

a program code of a processing step of, if it is determined in the determination step that the access right is present, transferring the operation request to the operating system in the first terminal and returning a result from the operating system to the request source process; and a program code of a denial step of denying the operation request if it is determined in the determination step that no access right is present.

In order to achieve the above object, an information processing apparatus according to the present invention has the following arrangement. That is, there is provided an information processing apparatus connected to another terminal through a communication network, comprising:

trap means for trapping an operation request from a process or operating system for computer resource(s) in the other terminal before access to the computer resource; and reception means for receiving a reply to the operation request.

In order to achieve the above object, an information processing apparatus according to the present invention has the following arrangement. That is, there is provided an information processing apparatus connected to another terminal through a communication network, comprising:

determination means for determining whether an access right is present for computer resource(s) in the information processing apparatus, which is designated by an operation request for the computer resource trapped by the other terminal before access to the computer resource;

processing means for, if it is determined by the determination means that the access right is present, transferring the operation request to an operating system in the other terminal and returning a result from the operating system to the request source process; and denial means for denying the operation request if it is determined by the determination means that no access right is present.

In order to achieve the above object, an information processing method according to the present invention has the following arrangement. That is, there is provided an information processing method for an information processing apparatus connected to another terminal through a communication network, comprising:

a trap step of trapping an operation request from a process or operating system for computer resource(s) in the other terminal before access to the computer resource; and a reception step of receiving a reply to the operation request.

In order to achieve the above object, an information processing method according to the present invention has the following arrangement. That is, there is provided an information processing method for an information processing apparatus connected to another terminal through a communication network, comprising:

a determination step of determining whether an access right is present for computer resource(s) in the information processing apparatus, which is designated by an operation request for the computer resource trapped by the other terminal before access to the computer resource;

a processing step of, if it is determined in the determination step that the access right is present, transferring the operation request to an operating system in the other terminal and returning a result from the operating system to a request source process; and a denial step of denying the operation request if it is determined in the determination step that no access right is present.

In order to achieve the above object, a storage medium according to the present invention has the following arrangement. That is, there is provided a storage medium which stores program codes of information processing of an information processing apparatus connected to another terminal through a communication network, comprising:

a program code of a trap step of trapping an operation request from a process or operating system for computer resource(s) in the other terminal before access to the computer resource; and a program code of a reception step of receiving a reply to the operation request.

In order to achieve the above object, a storage medium according to the present invention has the following arrangement. That is, there is provided a storage medium which stores program codes of information processing of an information processing apparatus connected to another terminal through a communication network, comprising:

a program code of a determination step of determining whether an access right is present for computer resource(s) in the information processing apparatus, which is designated by an operation request for the computer resource trapped by the other terminal before access to the computer resource;

a program code of a processing step of, if it is determined in the determination step that the access right is present, transferring the operation request to an operating system in the other terminal and returning a result from the operating system to the request source process; and a program code of a denial step of denying the operation request if it is determined in the determination step that no access right is present.

In order to achieve the above object, a program according to the present invention has the following arrangement. That is, there is provided a program which causes a computer to execute information processing of an information processing apparatus connected to another terminal through a communication network, comprising:

a program code of a trap step of trapping an operation request from a process or operating system for computer resource(s) in the other terminal before access to the computer resource; and a program code of a reception step of receiving a reply to the operation request.

In order to achieve the above object, a program according to the present invention has the following arrangement. That is, there is provided a program which causes a computer to execute information processing of an information processing apparatus connected to another terminal through a communication network, comprising:

a program code of a determination step of determining whether an access right is present for computer resource(s) in the information processing apparatus, which is designated by an operation request for the computer resource trapped by the other terminal before access to the computer resource;

a program code of a processing step of, if it is determined in the determination step that the access right is present, transferring the operation request to an operating system in the other terminal and returning a result from the operating system to the request source process; and a program code of a denial step of denying the operation request if it is determined in the determination step that no access right is present.

In order to achieve the above object, an information processing apparatus according to the present invention has the following arrangement. That is, there is provided an information processing apparatus deals as an electronic information provider for converting digital information into protected digital information to restrict operations on the digital information, comprising a computer which can access target digital information, a storage medium such as a memory or hard disk to store the target digital information and protected digital information, and an external medium device such as a floppy disk drive or communication line as means for providing the digital information.

On the other hand, there is provided an information processing apparatus deals as an electric information receiver using protected digital information, comprising a computer which can access received protected digital information and use target digital information, a storage medium such as a memory or hard disk to temporarily store the protected digital information and target digital information, an input/output device such as a display, printer, or keyboard in accordance with use contents of the digital information, and an external medium device such as a floppy disk drive or communication line as means for receiving the protected digital information.

The protected digital information is formed by adding a restricting program for controlling operation(s) on the target digital information and a restricting attribute which defines contents of restricted operations such as inhibition of printing or copy of the digital information to the target digital information and converting them altogether into an executable format.

Processing of adding the restricting program and restricting attribute to the target digital information to convert the original digital information is called protection, and the digital information converted by protection is called protected digital information. The program which realizes protection is called a protecting program.

The restricting program is formed from an expansion routine section to make the protected digital information usable as the original digital information and a restricting routine section to control access to the digital information.

The restricting attribute holds at least one set of operation to be restricted for the digital information and a condition, and holds information that specifies a program such as an application used to access the digital information as needed.

An application means a program used to access the digital information, e.g., word processor software to access a document file or a program for reproducing or editing an image or moving image.

The application need not always be an application operated by the user. A program that accesses digital information using the function of an OS or platform will be generally called an application.

Examples of OSs (Operating Systems) are Windows available from Microsoft Corporation, MacOS available from Apple Computer Inc., and an OS generally called UNIX (registered trademark of X/Open Company Limited). An OS runs even on a portable terminal device. A platform sometimes is indicated as an OS. More widely speaking, even browser software used to browse Web information is included in platforms because it can be regarded as a basic program on a computer, which can provide a versatile environment for processing digital information and execute a program having an executable format on that environment.

According to the present invention, there is provided an information processing apparatus on a digital information providing side, comprising:

storage means for reading and storing the digital information;

first adding means for adding restricting attribute information to the digital information, wherein the restricting attribute information defines contents of operation restriction for the digital information;

second adding means for adding a restricting program to the digital information, wherein the restricting program for monitoring and controlling operation(s) on the digital information; and output means for outputting the digital information to which the restricting attribute information and restricting program are added by the first and second adding means altogether as data having an executable format.

According to the present invention, an information processing apparatus on a digital information receiving side can execute protected digital information, and processing in executing the protected digital information comprises:

activation means for activating the data having the executable format, which contains digital information to which restricting attribute information that defines contents of operation restriction for the digital information and a restricting program for monitoring and controlling operation(s) on the digital information are added;

read means for reading a restricting routine section for monitoring and controlling the operation(s) on the digital information from the restricting program and activating the restricting routine section;

acquisition means for acquiring a target application to operate the digital information from the restricting attribute information;

application activation means for activating the application acquired by the acquisition means;

determination means for determining whether the application has been successfully activated by the application activation means;

end means for ending activation of the data having the executable format when it is determined by the determination means that the activation of the application has failed;

operation means for decoding the digital information into a state operable from the application when it is determined by the determination means that the application has been successfully activated; and processing means for transferring the decoded digital information to the activated application.

When the restricting attribute information contains no application information that specifies the target application, the application activation means preferably automatically recognizes the application to be activated.

As example of automatic recognition, when digital information is a file, an application may be defined by the OS on the basis of its extension. In addition, an application can be specified depending on the environment on the digital information receiving side. When an application to be used in using digital information is self-evident, the restricting attribute to be added by the first adding means requires no application information, and the application to be activated can be automatically recognized by the application activation means.

The apparatus preferably further comprises first delete means for deleting the decoded digital information when the activated application has released the decoded digital information, and second delete means for ending and deleting the activated restricting routine section when the activated application is ended.

In order to achieve the above object, an information processing method according to the present invention has the following arrangement. That is, there is provided an information processing method of protecting digital information on a digital information providing side, comprising:

a storage step of reading and storing the digital information;

a first adding step of adding restricting attribute information to the digital information, wherein the restricting attribute information defines contents of operation restriction on the digital information;

a second adding step of adding a restricting program to the digital information, wherein the restricting program for monitoring and controlling operation(s) on the digital information; and an output step of outputting the digital information to which the restricting attribute information and restricting program are added in the first and second adding steps altogether as data having an executable format.

There is also provided an information processing method of using protected digital information (data having an executable format) on a digital information receiving side, comprising:

an activation step of activating the data having the executable format;

a read step of reading a restricting routine section for monitoring and controlling operation(s) on digital information from a restricting program and activating the restricting routine section;

an acquisition step of acquiring a target application to operate the digital information from restricting attribute information;

an application activation step of activating the application acquired in the acquisition step;

a determination step of determining whether the application has been successfully activated in the application activation step;

an end step of ending activation of the data having the executable format when it is determined in the determination step that the activation of the application has failed;

an operation step of decoding the original digital information into a state operable from the application when it is determined in the determination step that the application has been successfully activated; and a processing step of transferring the decoded digital information to the activated application.

In the application activation step, when the restricting attribute information contains no application information that specifies the target application, the application to be activated is preferably automatically recognized.

The method preferably further comprises a first step of deleting the decoded digital information when the activated application has released the decoded digital information, and a second delete step of ending and deleting the activated restricting routine section when the activated application is ended.

In order to achieve the above object, an information processing system according to the present invention has the following arrangement. That is, there is provided an information processing system constituted by connecting first and second terminals through a communication network, wherein the first terminal comprises:

storage means for reading and storing digital information;

first adding means for adding restricting attribute information to the digital information, wherein the restricting attribute information defines contents of operation restriction on the digital information;

second adding means for adding a restricting program to the digital information, wherein the restricting program for monitoring and controlling operation(s) on the digital information;

output means for outputting the digital information to which the restricting attribute information and restricting program are added by the first and second adding means altogether as data having an executable format; and transmission means for transmitting the data having the executable format to the second terminal, and the second terminal comprises:

reception means for receiving the data having the executable format from the first terminal;

activation means for activating the data having the executable format;

read means for reading a restricting routine section for monitoring and controlling the operation(s) on the digital information from the restricting program and activating the restricting routine section;

acquisition means for acquiring a target application to operate the digital information from the restricting attribute information;

application activation means for activating the application acquired by the acquisition means;

determination means for determining whether the application has been successfully activated by the application activation means;

end means for ending activation of the data having the executable format when it is determined by the determination means that the activation of the application has failed;

operation means for decoding the digital information into a state operable from the application when it is determined by the determination means that the application has been successfully activated; and processing means for transferring the decoded digital information to the activated application.

In order to achieve the above object, a program according to the present invention has the following arrangement. That is, there is provided a program which protects digital information to restrict operation(s) on the digital information on a digital information providing side, comprising:

a program code of a storage step of reading and storing the digital information;

a program code of a first adding step of adding restricting attribute information to the digital information, wherein the restricting attribute information defines contents of operation restriction on the digital information;

a program code of a second adding step of adding a restricting program to the digital information, wherein the restricting program restricting program for monitoring and controlling operation(s) on the digital information; and a program code of an output step of outputting the digital information to which the restricting attribute information and restricting program are added in the first and second adding steps altogether as data having an executable format.

There is also provided a program which uses protected digital information on a digital information receiving side, comprising:

a program code of an activation step of activating the data having the executable format, which contains digital information to which restricting attribute information that defines contents of operation restriction on the digital information and a restricting program for monitoring and controlling operation(s) on the digital information are added;

a program code of a read step of reading a restricting routine section for monitoring and controlling operation(s) on digital information from a restricting program and activating the restricting routine section;

a program code of an acquisition step of acquiring a target application to operate the digital information from restricting attribute information;

a program code of an application activation step of activating the application acquired in the acquisition step;

a program code of a determination step of determining whether the application has been successfully activated in the application activation step;

a program code of an end step of ending activation of the data having the executable format when it is determined in the determination step that the activation of the application has failed;

a program code of an operation step of decoding the digital information into a state operable from the application when it is determined in the determination step that the application has been successfully activated; and a program code of a processing step of transferring the decoded digital information to the activated application.

In the application activation step, when the restricting attribute information contains no application information that specifies the target application, the application to be activated is preferably automatically recognized.

The program preferably further comprises:

a program code of a first step of deleting the decoded digital information when the activated application has released the decoded digital information, and a program code of a second delete step of ending and deleting the activated restricting routine section when the activated application is ended.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing the data structure of an access right management table according to the first embodiment of the present invention;

FIG. 8 is a view showing the access monitor log display window according to the first embodiment of the present invention;

FIG. 13A is a view showing the structure of protected digital information according to the third embodiment of the present invention;

FIG. 13B is a view showing the structure of a restricting program according to the third embodiment of the present invention;

FIG. 13C is a view showing the structure of a restricting attribute according to the third embodiment of the present invention;

DETAILED DESCRIPTION OF THE PREFERRED EMBODIMENTS

The embodiments of the present invention will be described below in detail with reference to the accompanying drawings.

Figure 1A:
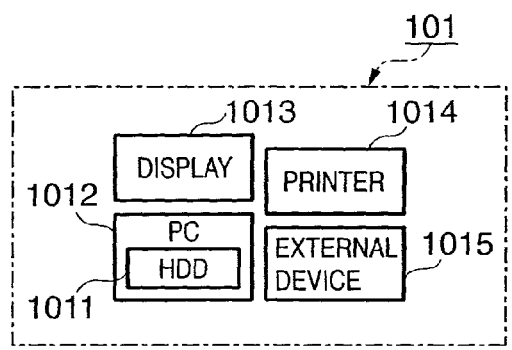
FIG. 1A is a block diagram showing the hardware configuration of a practice environment according to the first embodiment of the present invention.
Figure 1B:
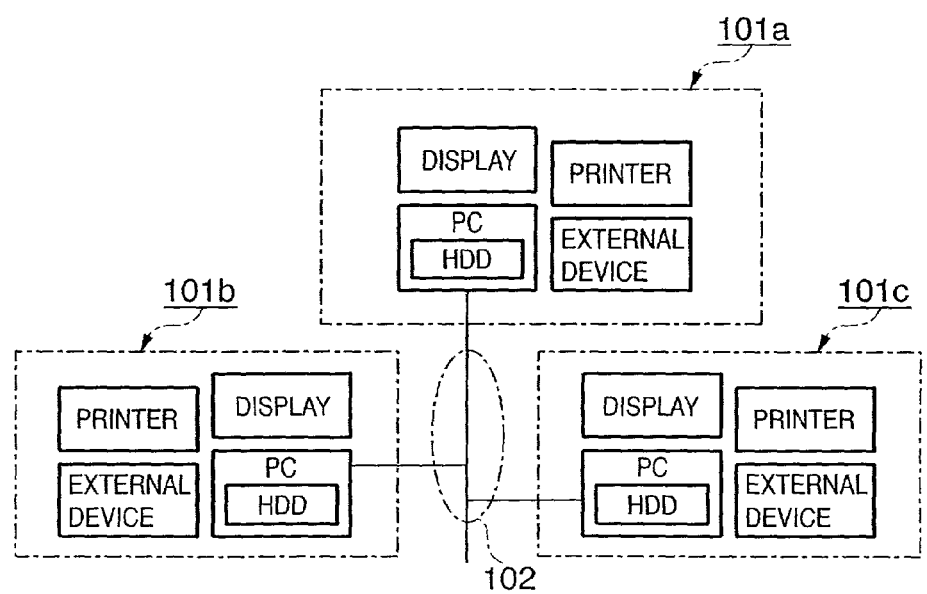
FIG. 1B is a block diagram showing the hardware configuration of the practice environment according to the first embodiment of the present invention.

FIGS. 1A and 1B are block diagrams showing the hardware configuration of an embodiment of an environment where the present invention is to be practiced.

The configuration shown in FIG. 1A is the hardware configuration of a standalone computer 101 which comprises a personal computer (PC) 1012 having a hard disk drive (HDD) 1011, a display 1013, a printer 1014, and an external device 1015 capable of outputting resource data to the outside.

A general-purpose OS and application are installed in the personal computer 1012. A resource management program according to the present invention is also installed.

FIG. 1B shows a configuration using a network 102. Computers 101a to 101c each having the same arrangement as that shown in FIG. 1A are connected to each other through the network 102.

In this configuration, an application generally uses an API (Application Program Interface) provided by the OS to access resources managed by the OS. Each OS uses a specific API using method so that an execution code section that uses the API can be discriminated. In the present invention, a monitor routine for monitoring all APIs necessary for access to resources is prepared. Before an application uses an API, its execution code section is changed or the entrance of API processing is replaced with the monitor routine such that the monitor routine is used at the time of use of the API. The monitor routine processes the API required by the application, or returns a result to the application as an illicit command without executing the API processing. The access right extended by the resource management program of the present invention is managed by this program independently of management of the OS, and a monitor routine is prepared for each type of access right. With this method, access from an application that illicitly uses resources is restricted from that application.

Figure 2:
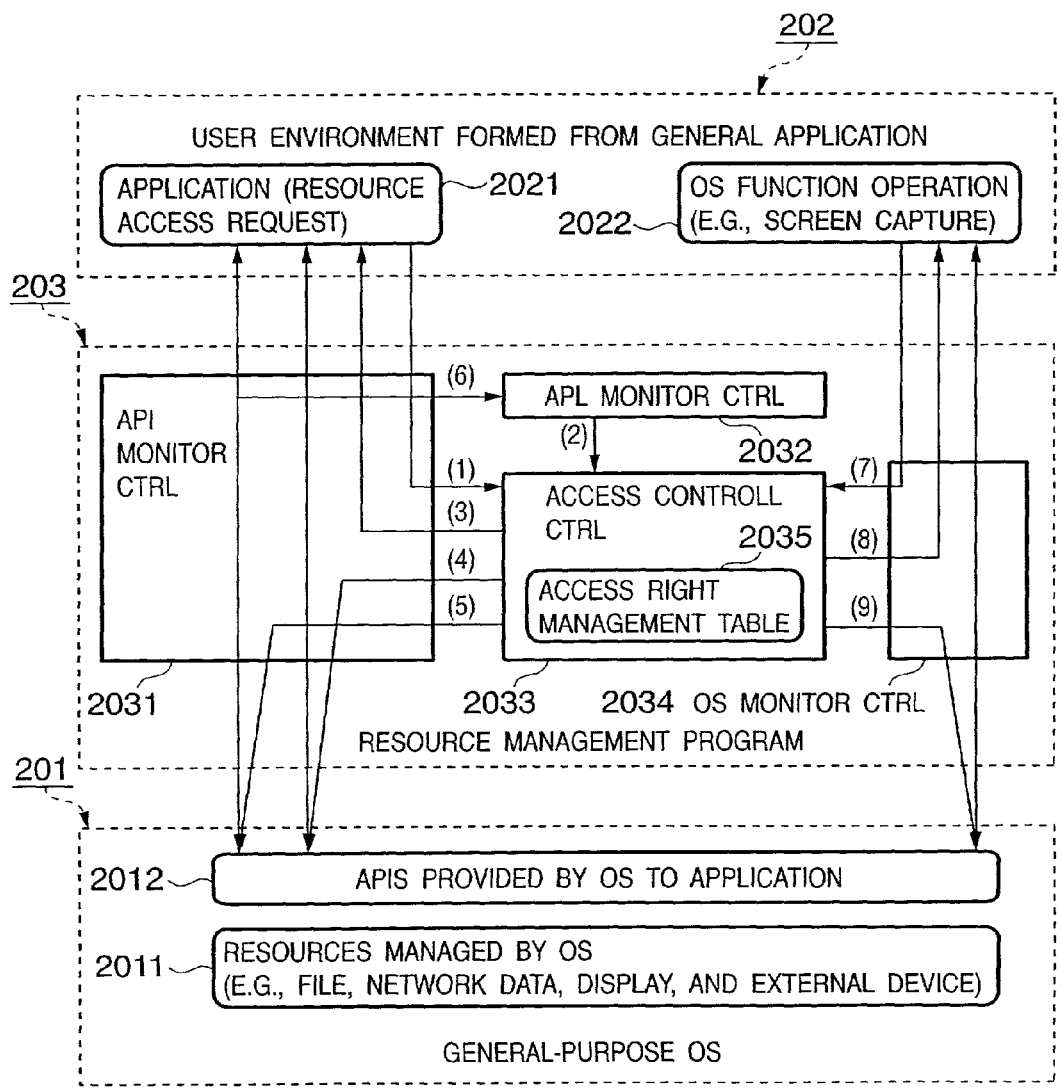
FIG. 2 is a view showing the functional arrangement of a resource management program according to the first embodiment of the present invention and the relationship between the OS and the application.

FIG. 2 is a view showing the arrangement of a resource management program 203 according to the present invention and the concept of API monitor/control. The resource management program 203 comprises an API monitor controller (API monitor CTRL) 2031, APL (application) monitor controller (APL monitor CTRL) 2032, access control controller (access control CTRL) 2033, and OS monitor controller (OS monitor CTRL) 2034.

This resource management program 203 is located between a general-purpose OS 201 and a user environment 202 formed from an application 2021 which issues a resource access request, and a general application which comprises an OS function operation 2022 such as screen capture to monitor requests for resources provided by the general-purpose OS 201 and user environment 202.

The general-purpose OS 201 comprises resources 2011 managed by the OS and APIs 2012 provided by the OS to the application 2021.

The API monitor CTRL 2031 in the resource management program 203 according to the present invention is a module that monitors all APIs necessary for access control. The APL monitor CTRL 2032 is a module which stores resources held by the application 2021. The access control CTRL 2033 is a module which determines whether access to—the resources 2011 is permitted and has an access right management table 2035. The OS monitor CTRL 2034 is a module which monitors operation(s) of accessing a resource by the function of the general-purpose OS 201.

As shown in FIG. 3, the access right management table 2035 is designed to be able to register resource designation information 20351, condition 20352, and n pieces of access right information 20353 to 2035n for each resource.

The resource designation information 20351 designates a specific one of the resources 2011 managed by the general-purpose OS 201. For, e.g., a file, information such as a file name or file ID is registered. For communication data, a host name, port number, IP address, or the like is registered. For a memory, an object name, address, or the like, which indicates the object is registered. For an external device, a device name indicating its device driver or the like is registered.

The condition 20352 represents a condition or a combination of conditions under which the access right is validated. For example, a user name/ID, group name/ID, time, application limited for use, and the like are registered.

Each of the access right information 20353 to 2035n represents, of access rights that are extended but not defined in the existing environment, a right added to a designated resource. For example, a right to move a file to another medium, a right to copy to another medium, a right to print, a right to write to a shared memory (e.g., the clipboard for Windows), a right to capture the screen, application limited for use (usage inhibition of application except a specific application or inhibition of attachment to mail), or the like is registered.

Generally, access to a resource is sometimes done by a plurality of APIs. In this case, resource designation information may be converted into an ID (e.g., a handle) managed by the OS. In the resource management program 203, resource designation information and its ID are regarded as identical.

Processing of the resource management program 203 having the above arrangement will be described in accordance with information transmission procedures indicated by (1) to (9) in FIG. 2.

(1) If an access request to a resource using an API issued by the application 2021 is received, the API monitor CTRL 2031 traps the request and transmits it to the access control CTRL 2033.

(2) In checking the access right, the access control CTRL 2033 acquires information of resources held by the application 2021 from the APL monitor CTRL 2032 as needed.

(3) There are two conditions for access denial. Under a first condition A (access denial A), the access right to the resource is checked in relation to the access request (1) by looking up the access right management table 2035. If the check result indicates the absence of the right, an access denial error is returned as a result without executing processing of the API issued by the application 2021.

(4) Under a second condition B (access denial B), the access right to the resource is checked in relation to the access request (1) by looking up the access right management table 2035. If the check result indicates the absence of the right, and no error can be returned as a result of the API issued by the application 2021, the access request is replaced with an access request to a dummy resource prepared by the resource management program 203 in advance, and API processing is executed without executing process for the resource requested by the application 2021.

As a consequence, the application 2021 operates as if the request were successful but, in fact, cannot access the requested resource.

(5) If access right check for the access request (1) reveals the presence of the right, the API monitor CTRL 2031 traps the access request, directly transmits processing of the API issued by the application 2021 to the general-purpose OS 201, and returns the result to the application 2021.

(6) When the API is successful in the processing (5), and the application 2021 holds the resource by the API, the APL monitor CTRL 2032 is notified of it. The APL monitor CTRL 2032 registers the correlation between the application 2021 and the held resource.

Even when the application 2021 issues a resource release request API, and the API processing is successfully done, the APL monitor CTRL 2032 is notified of it. The APL monitor CTRL 2032 deletes the correlation between the application 2021 and the held resource.

(7) When an access request to a resource is issued by the operation(s) of the OS standard function, the OS monitor CTRL 2034 traps the access request and transmits it to the access control CTRL 2033.

(8) The access right to the resource is checked in relation to the access request (7) by looking up the access right management table 2035. If the check result indicates the absence of the right, the operation (7) is neglected.

(9) The access right to the resource is checked in relation to the access request (7) by looking up the access right management table 2035. If the check result indicates the presence of the right, the operation (7) is transmitted to the general-purpose OS 201.

Figure 4:
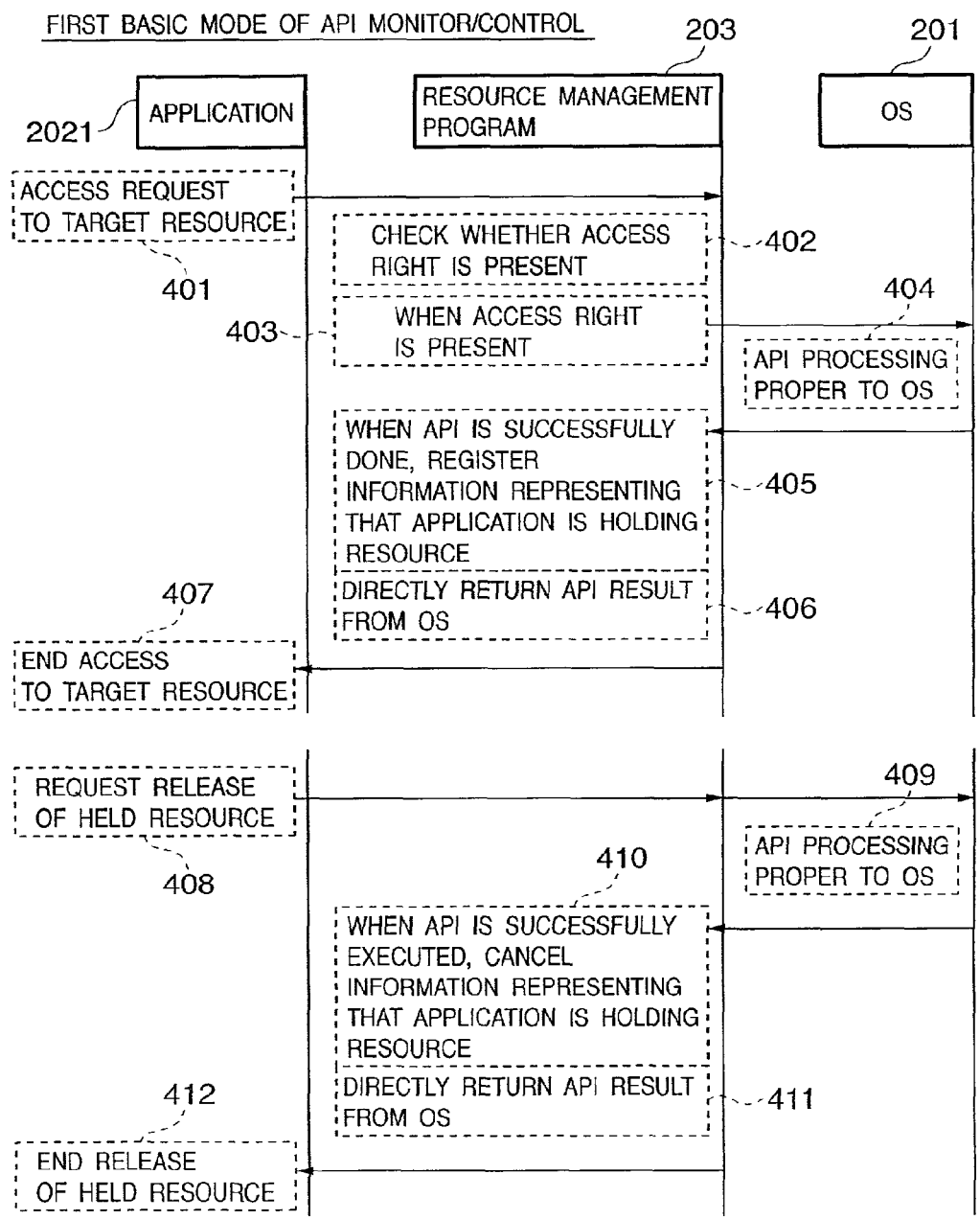
FIG. 4 is a sequence chart showing the first basic mode of API monitor/control in the first embodiment of the present invention.

FIG. 4 is a sequence chart of the first basic mode (1) of API monitor/control, which shows processing between the application 2021, the resource management program 203, and the general-purpose OS 201 until a target resource is released when an access right to the resource is present.

In this first basic mode (1), when an access request to a target resource by an API issued by the application 2021 is received (step 401), the resource management program 203 checks whether the application 2021 has an access right to the resource (step 402). If it is determined by the check that the access right is present (step 403), the API issued by the application 2021 is directly transmitted to the general-purpose OS 201. The general-purpose OS 201 executes API processing proper to the OS (step 404).

When the API processing is successfully done, the resource management program 203 registers information representing that the application 2021 holds the resource (step 405). Then, the API result from the general-purpose OS 201 is directly returned to the application 2021 (step 406). Access to the resource is ended (step 407).

After that, when a release request for the held resource is issued by the application 2021 (step 408), the resource management program 203 transmits the release request to the general-purpose OS 201. The general-purpose OS 201 executes API processing proper to the OS (step 409). When the API processing is successfully done, the resource management program 203 cancels the information representing that the application 2021 holds the resource (step 410). Then, the API result from the general-purpose OS 201 is directly returned to the application 2021 (step 411). With this processing, the held resource is released (step 412).

Figure 5:
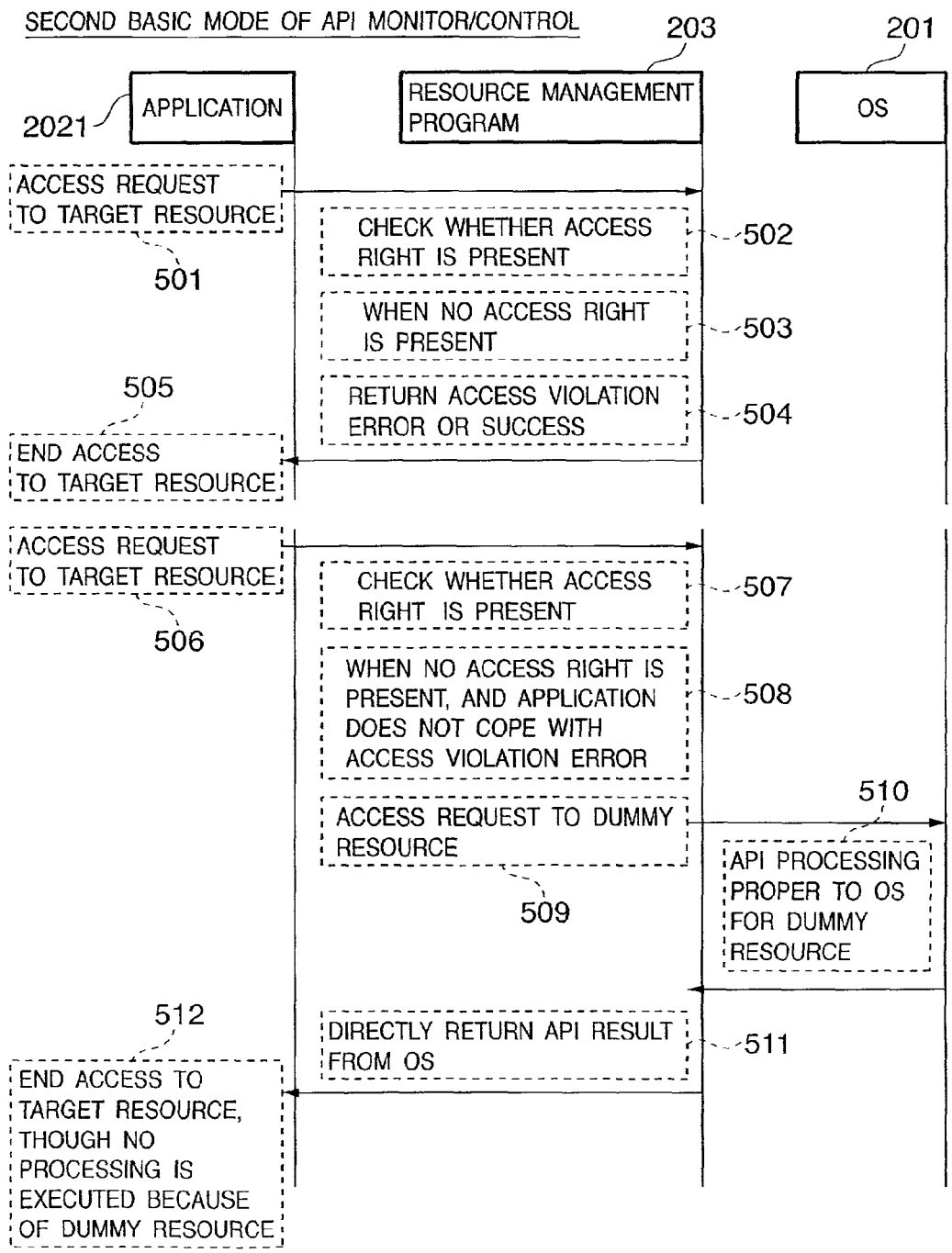
FIG. 5 is a sequence chart showing the second basic mode of API monitor/control in the first embodiment of the present invention.

FIG. 5 is a sequence chart of the second basic mode (2) of API monitor/control, which shows processing between the application 2021, the resource management program 203, and the general-purpose OS 201 until access to a target resource is denied when no access right to the resource is present.

In this second basic mode (2), when an access request to a target resource by an API issued by the application 2021 is received (step 501), the resource management program 203 checks whether the application 2021 has an access right to the resource (step 502). If it is determined by the check that no access right is present (step 503), an access denial error is returned to the application 2021 (step 504). With this processing, access processing to the resource is ended (step 505).

When an access request to a target resource by an API issued by the application 2021 which does not cope with any access denial error is received (step 506), the resource management program 203 checks whether the application 2021 has an access right to the resource (step 507). If it is determined by the check that no access right is present, and the application 2021 does not cope with any access denial error (step 508), the access request is replaced with an access request to a dummy resource prepared by the resource management program 203 in advance, and the access request is transferred to the general-purpose OS 201 (step 509).

The general-purpose OS 201 executes API processing proper as the OS (step 510). The resource management program 203 directly returns the API processing result from the general-purpose OS 201 to the application 2021 (step 511). As a consequence, the access to the target resource is ended, though no processing is executed at all because of the dummy resource (step 512).

In the above way, the present invention restricts access to a resource for which no access right is present. APIs for Windows and UNIX as general-purpose OSs will be exemplified.

An example of inhibition of file copy processing will be described first.

In conventional file copy processing, a readable file can be copied. As a consequence, a plurality of copies of an original file may be present, or a file can be transferred to another medium and brought out. In the present invention, APIs that realize file copy are monitored, thereby inhibiting copy of a file for which no right is present. APIs to be monitored/controlled for Windows are as follows. The functions of APIs to be exemplified below are published in various references, and a detailed description thereof will be omitted.

(1) File Open/Create API
   CreateFileA
   CreateFileW
   OpenFile
   _lopen
   _lcreat
   GetOpenFileNameA
   GetOpenFileNameW
   GetSaveFileNameA
   GetSaveFileNameW (2) File Close API
   CloseHandle
   _lclose (3) File Copy/Move API
   CopyFileA
   CopyFileW
   MoveFileA
   MoveFileW
   MoveFileExA
   MoveFileExW
   DeleteFileA
   DeleteFileW
   DragQueryFileA
   DragQueryFileW APIs to be monitored/controlled for UNIX are as follows.

(1) File Open/Create API
  open
  creat (2) File Close API
  close (3) File Copy/Move API
  rename To inhibit file copy processing by monitoring such API(s), three specific methods are used.

<Method 1> (when it is Known that Copy Processing Will Be Executed During File Open)

While an application is opening and holding a file that the user has no right to copy (during a period until the file is closed), creation of another file by the application is denied.

<Method 2> (When it is Known that Copy Processing May be Executed after File Close but a Plurality of Files Will not be Processed)

When an application opens even once a file where user has no right to copy, creation of another file by the application is denied until the application is ended or a file where the user has a right to copy is opened.

<Method 3> (when Copy Processing May be Executed after File Close, and a Plurality of Files May be Processed)

When an application opens even once a file where the user has no right to copy even once, creation of another file by the application is denied until the application is ended.

In either method, when it is known that no copy will be left by another created file (e.g., when a temporary file is created), file creation is not denied.

An example of inhibition of printing of a specific file or all files will be described next.

Conventionally, the contents of a file can be printed by an application having a printing function and brought out. In the present invention, APIs that realize printing are monitored/controlled, thereby inhibiting printing of a file for which no right to print is present. Even for external devices such as facsimile apparatuses, APIs that realize selection or control of each external device are monitored/controlled to do similar inhibition. APIs to be monitored/controlled for Windows and UNIX are as follows.

For Windows
(1) Device Open API
 CreateDCA
 CreateDCW
(2) Device close API
 ReleaseDC
 ClosePrinter
(3) Printer Selection/APL Processing API
 OpenPrinterA
 OpenP-rinterW
 GetPrinterA
 GetPrinterW
 SetPrinterA
 SetPrinterW
 SendMessageA
 SendMessageW
 PostMessageA
 PostMessageW
For UNIX
(1) Device open API
 open
(2) Device Control API
 ioctrl
(3) Device Close API
 close To inhibit printing by monitoring such API(s), three specific methods are used.

<Method 1> (when it is Known that Printing can be Executed During File Open)

While an application is opening and holding a file where the user has no right to print (during a period until the file is closed), printer selection and printer device open by the application are denied.

<Method 2> (When it is Known that Printing May be Executed after File Close but a Plurality of Files Will not be Processed)

When an application opens even once a file where the user has no right to print, printer selection and printer device open by the application are denied until the application is ended or a file for which the application has a right to print is opened.

<Method 3> (When Printing May be Executed after File Close, and a Plurality of Files May be Processed)

When an application opens even once a file where the user has no right to print, printer selection and printer device open by the application are denied until the application is ended.

An example of inhibition of use of an external device will be described next.

Conventionally, it is generally impossible to add a right on a function of an OS or an external device itself. In the present invention, a function capable of restricting APIs to be monitored/controlled or use of an external device is designated, thereby inhibiting the use of the function or external device. APIs to be monitored/controlled for Windows and UNIX are as follows.

For Windows
(1) Device Open API
 CreateFileA
 CreateFileW
 OpenFile
 _lopen
 _lcreat
(2) Device Close API
 CloseHandle
 _lclose
For UNIX
(1) Device Open API
 open
(2) Device Control API
 ioctrl
(3) Device Close API close For example, to inhibit printing by monitoring such API(s), the following detailed method is used.

<Method>

When the use of a specific external device is inhibited under a specific condition in the access right management table 2035, the use of the external device is inhibited by the following method. When a device open API request with the device name of the external device is received, an access inhibition error or an error representing that no external device is present is returned to deny the request.

An example of inhibition of copy of parts or all data in a file will be described next.

Conventionally, when a file is displayed on a screen by an application, some or all contents of the file can be copied or embedded in another file using a unit called an object by a function of the OS.

In the present invention, APIs (APIs of the clipboard or APIs of OLE) that realize transfer and embedding functions are monitored/controlled, thereby inhibiting appropriation of data for which no right to copy is present.

APIs to be monitored/controlled for Windows are as follows.

For Windows
(1) Copy/Embed API
 OpenClipboard
 SetClipboardData
 GetClipboardData
 GetOpenClipboardWindow
 OleCreate
 OleCreateEx
 OleCreateFromFile
 OleCreateFromFileEx
 OleCreateFromData
 OleCreateFromDataEx
 OleCreateLink
 OleCreateLinkEx
 OleCreateLinkFromData
 OleCreateLinkFromDataEx
 OleCreateLinkToFile OleCreateLinkToFileEx
CloseClipboard To inhibit copy processing by monitoring such API(s), four specific methods are used.

<Method 1> (when it is Known that Copy Processing can be Executed During File Open)

While an application is opening and holding a file where the user has no right to copy (during a period until the file is closed), registration of data in the form of a copied/embedded object by the application is denied, or null data is registered.

<Method 2> (when it is Known that Copy Processing May be Executed after File Close but a Plurality of Files Will not be Processed)

When an application opens even once a file where the user has no right to copy, registration of data in the form of a copied/embedded object by the application is denied, or null data is registered until the application is ended, or a file for which the application has a right to copy is opened.

<Method 3> (when Copy Processing May be Executed after File Close, and a Plurality of Files May be Processed)

When an application opens ever once a file where the user has no right to copy, registration of data in the form of a copied/embedded object by the application is denied, or null data is registered until the application is ended.

<Method 4> (when a File for which an Application has No Right to Copy is to be Loaded as an Embedded Object)

In loading a file where a user has no right to copy, in the object registration API or object acquisition API, an access denial error is returned, or null data is registered or acquired, thereby denying the processing request.

An example of inhibition of output of a file through a network will be described next.

Conventionally, in addition to file copy, file transfer to the outside through a network is possible, as in the FTP program. In the present invention, APIs for access to a network resource are monitored/controlled, thereby inhibiting output of file contents to the outside from an application which is using the file where the user has no right to externally output. APIs to be monitored/controlled for Windows and UNIX are as follows.

For Windows
  WSAStartup
  accept
  bind
  connect
  gethostbyname
  gethostbyaddr
  getprotobyname
  getprotobynumber
  getservbyname
  getservbyport
  getpeername
  getsockname
  gethostname
  getsockopt
  setsockopt
  recv
  recvfrom
  socket
  select
  send
  sendto
  WSASend
  WSASendTo
  WSAAsyncSelect
  WSAAsyncGetHostByAddr
  WSAAsyncGetHostByName
  WSAAsyncGetProtoByNumber
  WSAAsyncGetProtoByName
  WSAAsyncGetServByPort
  WSAAsyncGetServByName
  WSACancelAsyncRequest
  WSASetBlockingHook
  WSAUnhookBlockingHook
  WSACleanup
  closesocket
  shutdown For UNIX
  accept
  bind
  connect
  gethostbyname
  gethostbyaddr
  getprotobyname
  getprotobynumber
  getservbyname
  getservbyport
  getpeername
  getsockname
  gethostname
  getsockopt
  setsockopt
  recv
  recvfrom
  socket
  select
  send
  sendto
  closesocket
  shutdown To inhibit data output to the outside from an application which is using a file by monitoring such API(s), three specific methods are used.

<Method 1> (when it is Known that Output Processing can be Executed During File Open)

While an application is opening and holding a file where the user has no right to externally output (during a period until the file is closed), a connection request or transmission request from the application is denied by an access denial or timeout error.

<Method 2> (when it is Known that Output Processing May be Executed after File Close but No Plurality of Files will be Processed)

When an application opens a file where the user has no right to output even once, a connection request or transmission request from the application is denied by an access denial or timeout error until the application is ended, or a file where the user has a right to output is opened.

<Method 3> (when Output Processing May be Executed after File Close, and a Plurality of Files May be Processed)

When an application opens even once a file where the user has no right to output, a connection request or transmission request from the application is denied by an access denial or timeout error until the application is ended.

However, if it is known that no data will be output by the communication, the request is not denied.

An example of inhibition of image acquisition from file contents will be described next.

It is generally possible as a function of an OS to acquire a partial or entire screen or a screen in a window unit as image data, and conventionally, the image data can be appropriated or output. In the present % invention, APIs for image data acquisition in a screen are monitored/controlled, thereby inhibiting image data acquisition.

APIs to be monitored/controlled for Windows are as follows.
(1) Device Open API
GetWindowDC
WindowFromDC
GetDC
GetDCEX
GetDesktopWindow
GetDeviceCaps
CreateDCA
CreateDCW
(2) Image Acquisition API
BitBlt
StretchBlt
(3) Device Close API
DeleteDC
ReleaseDC To inhibit screen image acquisition by monitoring such API(s), three specific methods are used.

<Method 1> (when Capture of the Entire Screen is to be Inhibited)

When an application that is holding a window currently displayed on the screen holds a file where the user has no right to acquire the screen image, acquisition of the entire screen image is denied. The presence/absence of image acquisition processing for the entire screen is determined by monitoring the state of a window that manages the entire screen (the desktop window for Windows). If an API for acquiring the image of the entire screen, such as DirectDraw in Windows, is present, the image acquisition is denied.

In addition, for an application which acquires a VRAM image from a display device, the image acquisition is denied.

<Method 2> (when Acquisition of the Screen Image of a Window is to be Denied)

When an application that is holding a window currently displayed on the screen holds a file where the user has no right to acquire the screen image, acquisition of the screen image of the window is denied. Whether the window is being displayed on the screen is determined by monitoring the state of the window.

Screen image acquisition is denied by denying image copy from a device context linked to the window.

<Method 3> (when Acquisition of a Partial Image of the Screen is to be Denied)

If an area where a screen image is to be acquired can be determined, the condition in <Method 1> is set to the time when the acquisition area overlaps the target window, and acquisition of the partial screen image is denied in accordance with the same procedure as in <Method 1>. If the area cannot be determined, acquisition of the entire screen image is denied in accordance with the same procedure as in <Method 1>.

An example of usable application restriction for each file type will be described next.

Conventionally, since application use is not restricted, a file can be accessed for a purpose other than lookup. In the present invention, use applications can be restricted for each file. APIs to be monitored/controlled for Windows are as follows.
(1) File open API
CreateFileA
CreateFileW
OpenFile
_lopen
_lcreat
(2) File Close API
CloseHandle
_lclose
(3) Process Management API
WinExec
CreateProcessA
CreateProcessW
ExitProcess
For UNIX
(1) File Open API
open
(2) File Close API
close To restrict use applications by monitoring such API(s), the following specific method is used.

<Method>

When an application is going to open a file, the right for the file is checked. If the application is not entitled to access that file, an access denial error is returned to deny the open request.

An example of inhibition of use of a specific function of an OS will be described next.

Conventionally, it is generally impossible to add a right to a function of an OS. In the present invention, a function of restricting APIs to be monitored/controlled is designated, thereby inhibiting the use of the function. For example, the time stamp of a file or a change in system date/time is inhibited. APIs to be monitored/controlled for Windows are as follows.
(1) API for Changing the Time Stamp of a File
SetFileTime
(2) API for Changing the System Date/Time
SetSystemTime
SetSystemtimeAdjustment To inhibit use of a specific function of an OS by monitoring such API(s), the following specific method is used.

<Method>

When an API which is inhibited under a specific condition is issued, an access denial error is returned, or dummy processing is executed without executing actual processing, and a normal result is returned, thereby denying the inhibited API (OS function).

An example of inhibition of lookup or change in process memory will be described next.

Conventionally, lookup/change in process memory cannot be inhibited unless an application explicitly denies it. In the present invention, lookup/change APIs for a process memory are monitored/controlled, thereby inhibiting lookup/change from another application.

APIs to be monitored/controlled for Windows are as follows
(1) Process Management API
OpenProcess
CreateProcess
CloseHandle
(2) Memory Operation API
ReadProcessMemory
WriteProcessMemory
ReadProcessMemoryVlm
WriteProcessMemoryVlm To inhibit lookup or change in process memory by monitoring such API(s), the following specific method is used.

<Method>

When a memory operation API is requested in the process memory of an application whose access is inhibited, an access denial error is returned.

An example of inhibition of printing, saving, or output to an external device of a Web page displayed on a browser will be described next.

Conventionally, even a Web page that permits only browse or reproduction can actually be printed or saved by browser software. An API which accesses a network resource for loading a Web page, and printing or saving by the browser is monitored/controlled, thereby inhibiting printing, saving, or output operation to an external device. APIs to be monitored/controlled are as follows.

For Windows (1) Communication API

WSAStartup
  accept
  bind
  connect
  gethostbyname
  gethostbyaddr
  getprotobyname
  getprotobynumber
  getservbyname
  getservbyport
  getpeername
  getsockname
  gethostname
  getsockopt
  setsockopt
  recv
  recvfrom
  socket
  select
  send
  sendto
  WSASend
  WSASendTo
  WSAAsyncSelect
  WSAAsyncGetHostByAddr
  WSAAsyncGetHostByName
  WSAAsyncGetProtoByNumber
  WSAAsyncGetProtoByName
  WSAAsyncGetServByPort
  WSAAsyncGetServByName
  WSACancelAsyncRequest
  WSASetBlockingHook
  WSAUnhookBlockingHook
  WSACleanup
  closesocket
  shutdown (2) API when the above-described file, printing, and operation of an external device are inhibited.

For UNIX (1)

accept
  bind
  connect
  gethostbyname
  gethostbyaddr
  getprotobyname
  getprotobynumber
  getservbyname
  getservbyport
  getpeername
  getsockname
  gethostname
  getsockopt
  setsockopt
  recv
  recvfrom
  socket
  select
  send
  sendto
  closesocket
  shutdown (2) any API when the above-described file, printing, and operation of an external device is inhibited.

To monitor such a communication API to inhibit printing, saving, or output to an external device, the following method is used.

First, an inhibition designation described in a Web page is read. More specifically, the data of an http protocol or an equivalent protocol is monitored. If the data field of a Web page in that data contains a printing or saving inhibiting designation tag, it is determined that printing or saving of the Web page is inhibited. Alternatively, the user is requested to acquire an access right, and if he/she cannot acquire the access right, it is determined that printing or saving is inhibited. However, if the user can acquire the access right, it is determined that printing or saving is not inhibited. That is, the presence/absence of an access right is determined depending on whether the access right can be acquired.

When the browser that is displaying the Web page for which printing, saving, or output to an external device is inhibited is going to print or save the Web page, the above-described method of inhibiting printing, file saving, or output to an external device is used to inhibit it.

The example of the Web page described here can also easily be used in the contents of a digital television because the mechanism resembles.

An application example of the resource management program will be described next.

Figure 6:
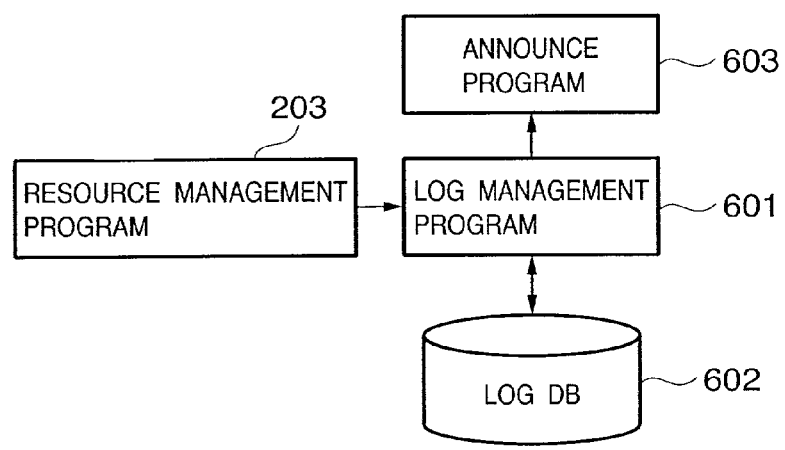
FIG. 6 is a block diagram showing a function of recording an access log in the first embodiment of the present invention.

FIG. 6 shows an arrangement in which the access situation of a resource managed by the resource management program 203 is transferred to a log management program 601, stored in a log management database (DB) 602, and displayed on the screen, as needed, as an access monitor log as shown in FIG. 8. When an illicit access is detected, a warning program 603 transmits and displays an illicit access message window having contents as shown in FIG. 7B on the terminal of the system manager.

Figure 7A:
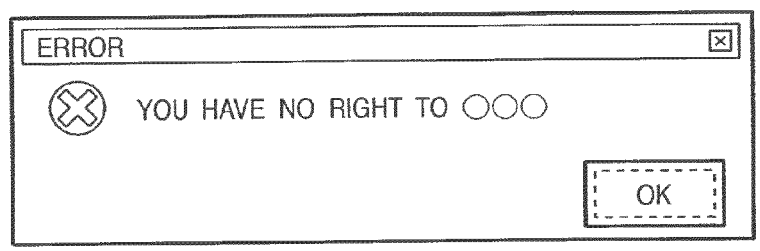
FIG. 7A is a view showing a window that indicates an illicit access in the first embodiment of the present invention.
Figure 7B:
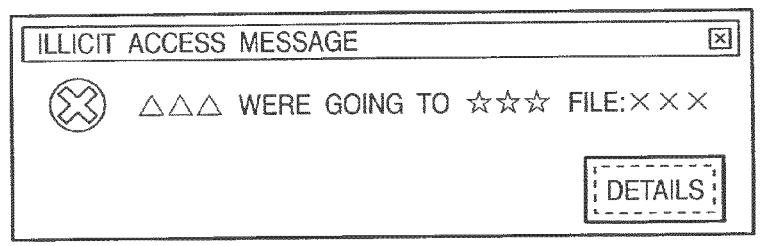
FIG. 7B is a view showing a window that notifies an occasion of an illicit access in the first embodiment of the present invention.
Figure 9:
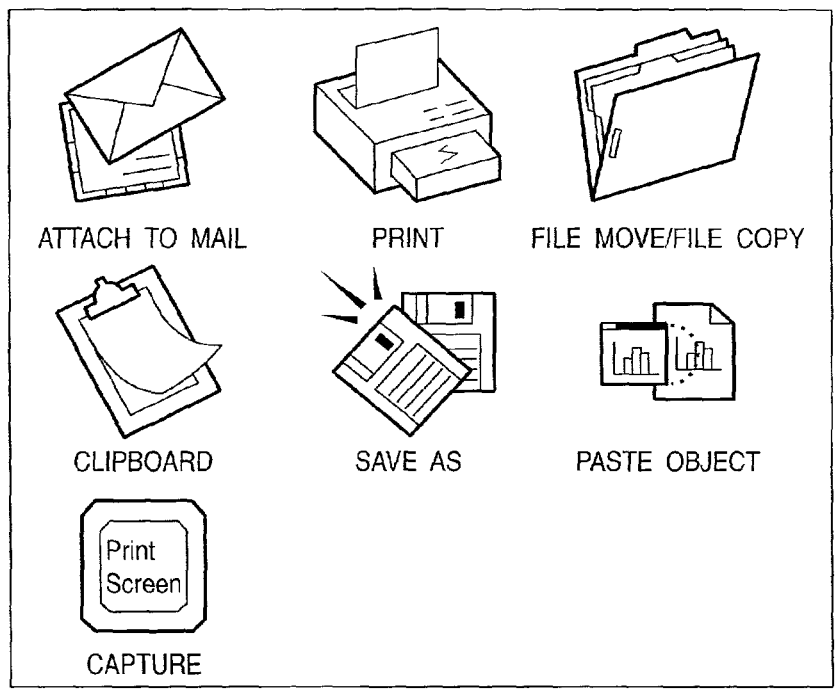
FIG. 9 is a view showing examples of a method of accessing resources to be subjected to access restriction.

When a general user has made an illicit access, a window as shown in FIG. 7A is displayed.

In the above description, the presence/absence of an access right is determined by looking up the access right management table 2035. However, the presence/absence of an access right may be determined by looking up access right information described in computer resource(s) to designate an access right that is extended and undefined in the existing environment.

"Network resources" used in the above description mean, of resources managed by an OS, resources related to a network, such as a communication medium, device, access point, channel of a digital television, communication data, and contents.

As described above, in the first embodiment, basically, the resource management program 203 traps an operation request from a process or OS for computer resource(s) managed by the OS, such as a file, network, storage device, display screen, or external device before access to the computer resource, and the presence/absence of an access right to the computer resource designated by the trapped operation request is determined. If it is determined that an access right is present, the operation request is transferred to the OS, and the result is returned to the request source process. On the other hand, if no access right is present, the operation request is denied. With this arrangement, for a user who has no access right, operation of resources including computer resources other than files and screen can be restricted without revising the OS or process (program such as an application or demon that runs on the OS).

In addition, only by installing the resource management program 203 in the existing environment, various kinds of illicit accesses described above can be restricted, and the range of the existing access right can be extended.

Furthermore, even when the requesting application has no function of coping with an access denial, the request is converted into an operation request for a dummy computer resource so that the present invention can deal with even an application having no function of coping with an access denial.

The resource management program 203 can be installed in a computer through various kinds of media such as a disk type storage represented by a CD-ROM, a semiconductor memory, or a communication network. The resource management program 203 can also be provided to a computer user as an independent programmed product.

The APIs described in the first embodiment are mere examples, and the present invention can easily cope with a case wherein any API is added by upgrading the OS.

Second Embodiment

Figure 10:
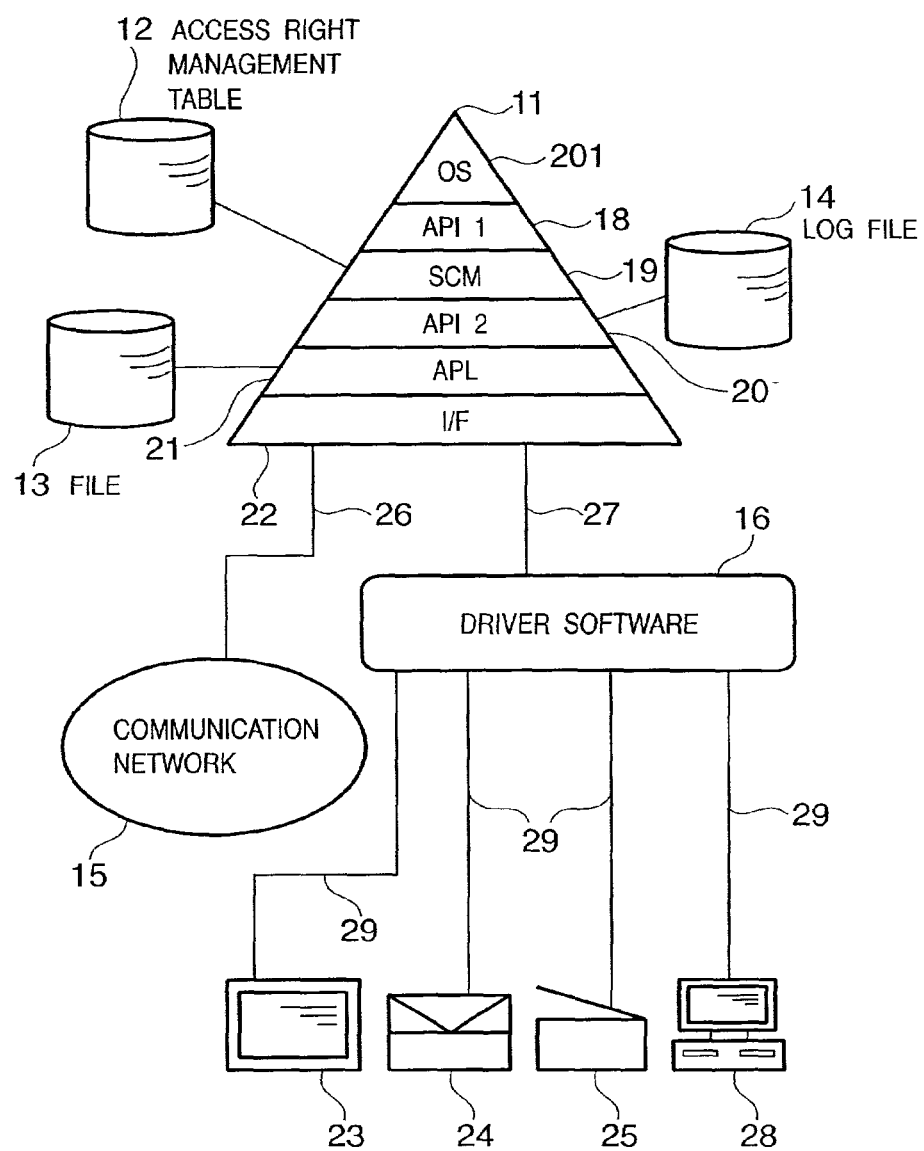
FIG. 10 is a view showing the arrangement of an H.H server according to the second embodiment of the present invention.

FIG. 10 is a view showing the system configuration of the second embodiment of the present invention.

Referring to FIG. 10, reference numeral 11 denotes a server having computer architecture of the present invention in the above-described security environment. It shows the entire configuration of a Humming Heads security management system (H.H system) implemented by a resource management program 203 of the first embodiment, i.e., the hierarchy of the computer architecture according to the present invention.

An OS 201 can be Windows, MacOS, or any other OS, as described above. As a characteristic feature, this H.H system does not depend on an OS. An API 1 (Application Program Interface 1) 18 is located in the OS 201 and has functions as an interface to the OS 201. This corresponds to APIs 2012 that the OS 201 in FIG. 2 provides to applications. An instruction is sent in accordance with a request from an SCM 19 corresponding to the resource management program 203.

In this case, an instruction is related to a method of providing information to a client, which denies any information disclosure, permits only browse, or permits copy, sending by e-mail, transfer, or the like The SCM (Security Control Management) 19 corresponds to the resource management program 203 in FIG. 2, which represents a H.H (Humming Heads) security module as the essence of the present invention. The SCM 19 monitors processing of the OS 201 or APL (application software) 21 and determines whether to permit/inhibit access to a resource by the APL 21 under a certain condition. An access right management table 12 is an extended form of an access right management table 2035 shown in FIG. 2. Especially, the access right management table 12 determines by what kinds of form a client can access to this system. In addition, when a client accesses the system, the name, telephone number, and ID number of the person are held in the access right management table 12, and on the basis of them, the location and importance of the accessing client are determined.

A client to be described here indicates one terminal for the server 11 or each, some, or all of a plurality of users who-use the terminal.

Especially, whether a client request is to be directly accepted or only conditionally permitted is determined on the basis of the personal data of the client, which are stored in the access right management table 12. In some cases, requested information can be provided to the client with charging. In this case, whether a client request is to be directly accepted or only conditionally permitted in accordance with the presence/absence of charging is set in advance in the personal data of a client.

An API 2 (Application Program Interface 2) 20 functions as an API between the APL 21 and the SCM The API 2 20 monitors accesses of a client, and up detecting accesses, transfers them to the OS 201. The API 2 20 also monitors external devices under the control of the OS 201. All resources requested by the OS 201 are subjected to the API 2 20. The API 2 (20) also has a function of a log management program shown in FIG. 6 and stores the log of accesses and requests from a client in a log file 14, as needed.

The APL 21 indicates various application programs such as Microsoft Office 2000, Word, Excel, or PowerPoint. A client uses/reproduces information such as a text, drawing, or a still image, moving image, voice/sound, or music under the control of the OS. Reference numeral 13 denotes a file created by the APL 21, which includes, e.g., various kinds of application software and files created by a client.

An interface (I/F) 22 connects, e.g., the server 11 having the SCM 19 to an external device. In this example, the server 11 is connected to a communication network 15 and, through driver software 16, to external devices (client 28, screen of a client 23, printer 24, and facsimile apparatus/copying machine 25).

Other clients can receive information using the external devices 23, 24, 25, and 26 through the communication network 15.

Reference numeral 26 denotes a public network commutation interface; 27, a communication line connected to serial and parallel connectors to connect external devices, including a USB, RS232C, and IEEE 1394; and 29, connection lines to the external devices. The driver software 16 is generally incorporated in the external devices 23, 24, 25, or 28, or the server 11.

Figure 11:
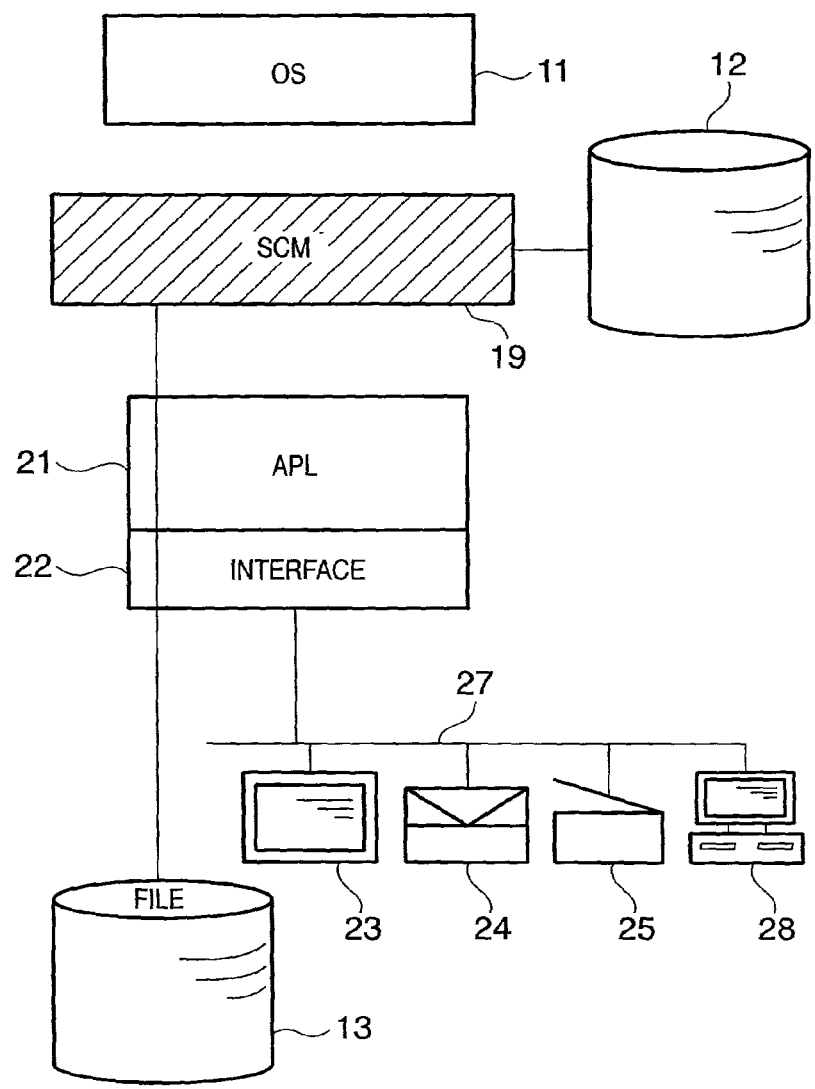
FIG. 11 is a view showing the relationship between an SCM, OS, file, and external device in the second embodiment of the present invention.

FIG. 11 is a schematic view showing the relationship between the OS 201, external devices 23, 24, 25, and 28, the file 13, and the SCM 19 in the configuration shown in FIG. 10.

The file 13 stores products created by clients, H.H sites (Humming Heads sites) provided by the server 11, and various kinds of information provided by the server 11. These pieces of information include texts, drawings, pictures, voice/sounds, still images, and moving images.

The SCM 19 is located between the OS 201 and the APL 21 to monitor clients' actions about selection and use of information. The SCM 19 checks clients' rights about information output to the external devices 23, 24, 25, and 28 and restricts the information output under the control of the OS 201. Restricting information output is giving a right to copy, sending by e-mail, or transfer of information, as described above.

The access right management table 12 stores clients' right information which is collated due to each request to restrict output to an external device. Each client needs to register personal information in advance. For companies, corporations, government administrations, or self-governing communities, the right may be restricted or given in accordance with the post such as a general manager, section chief, or clerical staff.

Additionally, an outside user may request to access as regulated client. In this case, pieces of information that can be externally output are classified into free information and chargeable information and managed by the SCM 19.

Third Embodiment

In the first and second embodiments, the resource management program 203 provides a secure environment of the present invention in an environment installed to servers or clients in advance. However, a secure environment of the present invention cannot be realized in a server or client in which the resource management program 203 is not installed in advance. In the third embodiment, an arrangement for realizing a security environment of the present invention in a server or client in which the resource management program 203 is not installed in advance will be described.

Figure 12:
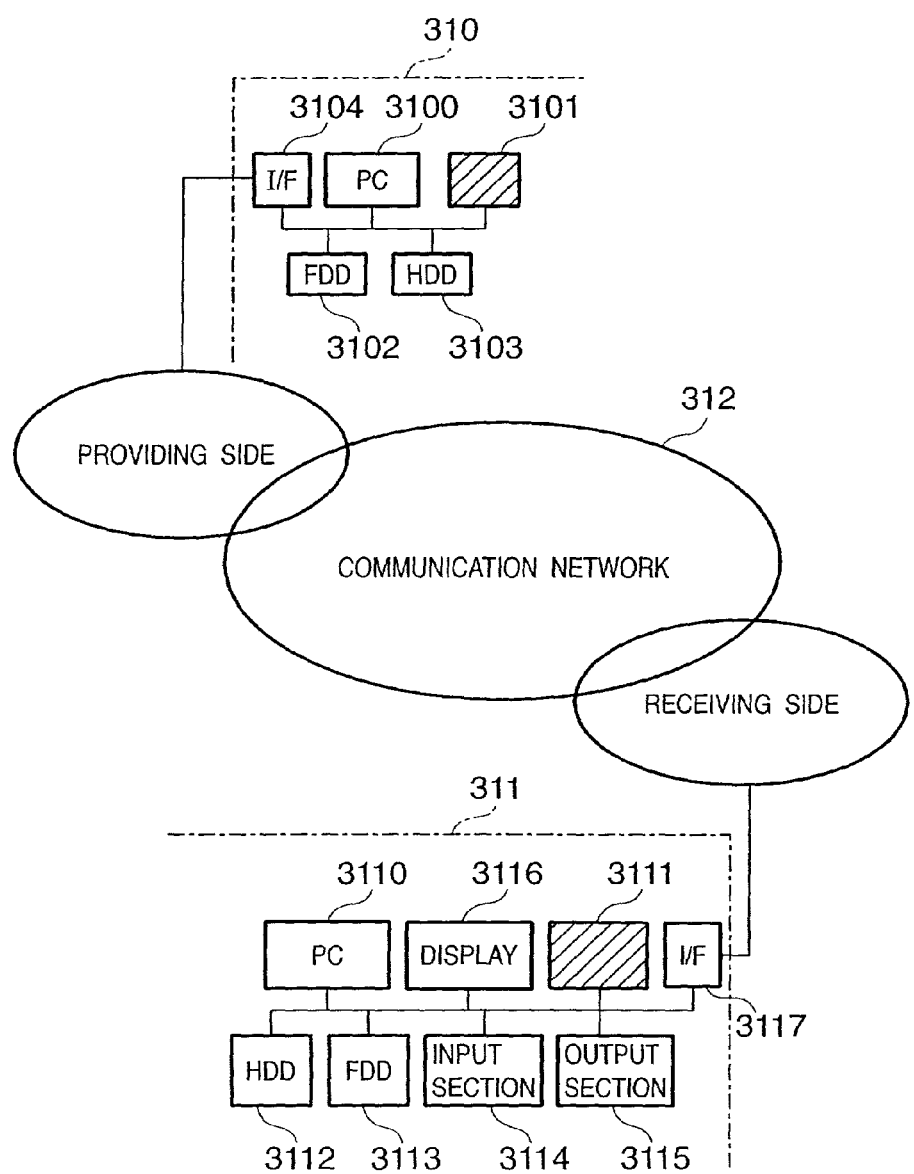
FIG. 12 is a view showing a hardware configuration according to the third embodiment of the present invention.

FIG. 12 is a view showing the system configuration according to the third embodiment.

FIGS. 13A to 13C show a system configuration comprising an information processing apparatus 310 for providing protected digital information, an information processing apparatus 311 for receiving and using the digital information, and a communication line 312 capable of transmitting the protected digital information to the receiving side.

The information processing apparatus 310 on the providing side comprises a computer (PC) 3100 having a hard disk drive (HDD) 3103, and an external device (e.g., a floppy disk drive (FDD)) 3102 capable of externally outputting protected digital information and holds digital information 3101 to be provided. The information processing apparatus 310 also has an external interface (I/F) 3104 connected to the communication line 312.

The PC 3100 is a general-purpose computer such as a personal computer or workstation and has a keyboard, mouse, display, and the like (not shown) as standard equipment of a general-purpose computer.

On the other hand, the information processing apparatus 311 on the receiving side comprises a computer (PC) 3110 having a hard disk drive (HDD) 3112, an external device (e.g., a floppy disk drive (FDD)) 3113 capable of loading external protected digital information, a display 3116, an output section 3115 such as a printer, facsimile apparatus, or copying machine, and an input section 3114 such as a keyboard or mouse, and holds protected digital information 3111 received through an external interface (I/F) 3117. The information processing apparatus 311 also has the external interface (I/F) 3117 connected to the communication line 312.

As described above, the providing-side information processing apparatus 310 and the receiving-side information processing apparatus 311 can exchange various kinds of digital information including protected digital information using the communication line 312.

A general-purpose OS or platform is installed in the PC 3100, and a protecting program according to the third embodiment is also installed therein.

A general-purpose OS and an application to access received digital information are installed in the PC 3110.

On the providing side, the digital information 3101 to be provided is converted into protected digital information by the protecting program. The created % protected digital information is transferred to the receiving side through the external device 3102 or communication line 312. The information processing apparatus 311 on the receiving side receives the protected digital information through the external device 3113 or communication line 312. When the received protected digital information is executed, target digital information can be used. However, the use range is restricted by protection on the digital information. For example, printing operation or users are restricted. Note that this restriction is realized by the resource management program 203 of the first embodiment.

As described above, in the third embodiment, protected digital information in which restricted operations are defined is transferred to the receiving side, so that the providing side can provide digital information while restricting the use range on the receiving side.

FIG. 13A is a view showing the structure of protected digital information. Protected digital information 320 contains a restricting program 321, restricting attribute 322, and original digital information 323 subjected to restriction. As shown in FIG. 13B, the restricting program 321 is formed from an expansion routine section 3210 and restricting routine section 3211. The restricting routine section 3211 corresponds to the resource management program 203 of the first embodiment.

In addition, as shown in FIG. 13C, the restricting attribute 322 is formed from target application information 3220, restricted operation information 32211 to 3221N, and restricting condition information 32221 to 3222N corresponding to the restricted operation information. A plurality of sets of restricted operation information and restricting condition information may be held, as needed. FIG. 3C shows a state wherein N sets of restricted operation information and restricting condition information are held.

Each restricted operation information designates a function to be restricted in functions of the application, OS, or platform. For example, printing, editing, displaying, acquiring screen image, or saving in an external device is restricted.

As a restricting condition, conditions for restricting operations are designated. For example, usable time, usable computer, usable user or group, or charge condition is designated.

To unconditionally restrict a specific operation, the restricting condition is omitted.

When a target application is self-evident, the target application information 3220 may be omitted. For example, as a case wherein the target application is self-evident, an application is specified by the extension of a target file in Windows.

Conversely, an application that can access the digital information can be restricted by explicitly indicating the target application.

The restricting routine section 3211 has program codes (resource management program 203 of the first embodiment) for monitoring and controlling operations on the target digital information. The contents and methods of realizing the processing are the same as described in the first embodiment.

Figure 14:
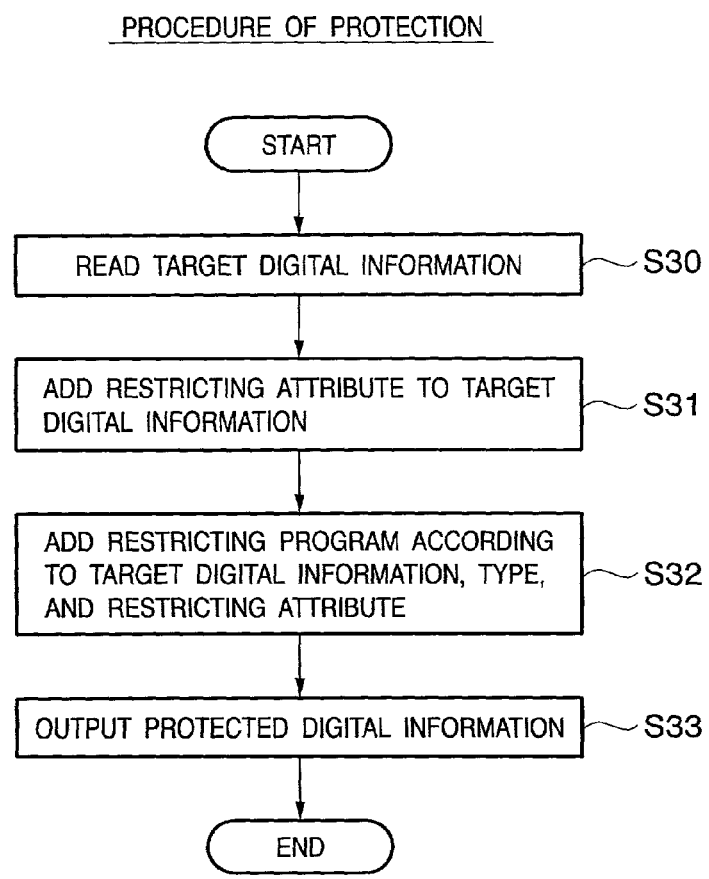
FIG. 14 is a flow chart showing a protected digital information providing procedure according to the third embodiment of the present invention.

FIG. 14 is a flow chart showing a protected digital information providing procedure according to the third embodiment.

In step S30, the target digital information 323 is read and stored in a storage medium such as a memory or hard disk.

The digital information 323 may be stored in an encrypted state. This makes it difficult to read the original digital information in the protected state and further improves security.

In step S31, the restricting attribute 322 which defines operations restricted for the digital information 323 and conditions for them is added to the digital information 323 stored in step S30. If necessary, the digital information 323 may contain application information for use of the digital information 323. If the application information is contained, the digital information can be accessed only by using the application.

In step S32, the restricting program 321 for controlling access to the digital information 323 is added to the digital information 323 stored in step S30. With this process, the protected digital information 320 is generated. Since it is enough that the restricting program 321 have at least program codes capable of controlling the restricted contents designated for the target digital information 323, the contents of the restricting program 321 can be differed depending on the target digital information 323 or restricting attribute 322.

In addition, since the restricting program 321 needs to be executable on the OS or platform on the side that receives the protected digital information 320, the program codes have an executable format in accordance with the user environment of the receiving side.

In step S33, the protected digital information 320 is output. The protected digital information 320 contains the digital information 323 stored in step S30 and the restricting attribute 322 and restricting program 321 which are added to the digital information 323 in steps S31 and S32, and has a format executable in the environment where the protected digital information 320 is used.

Figure 15:
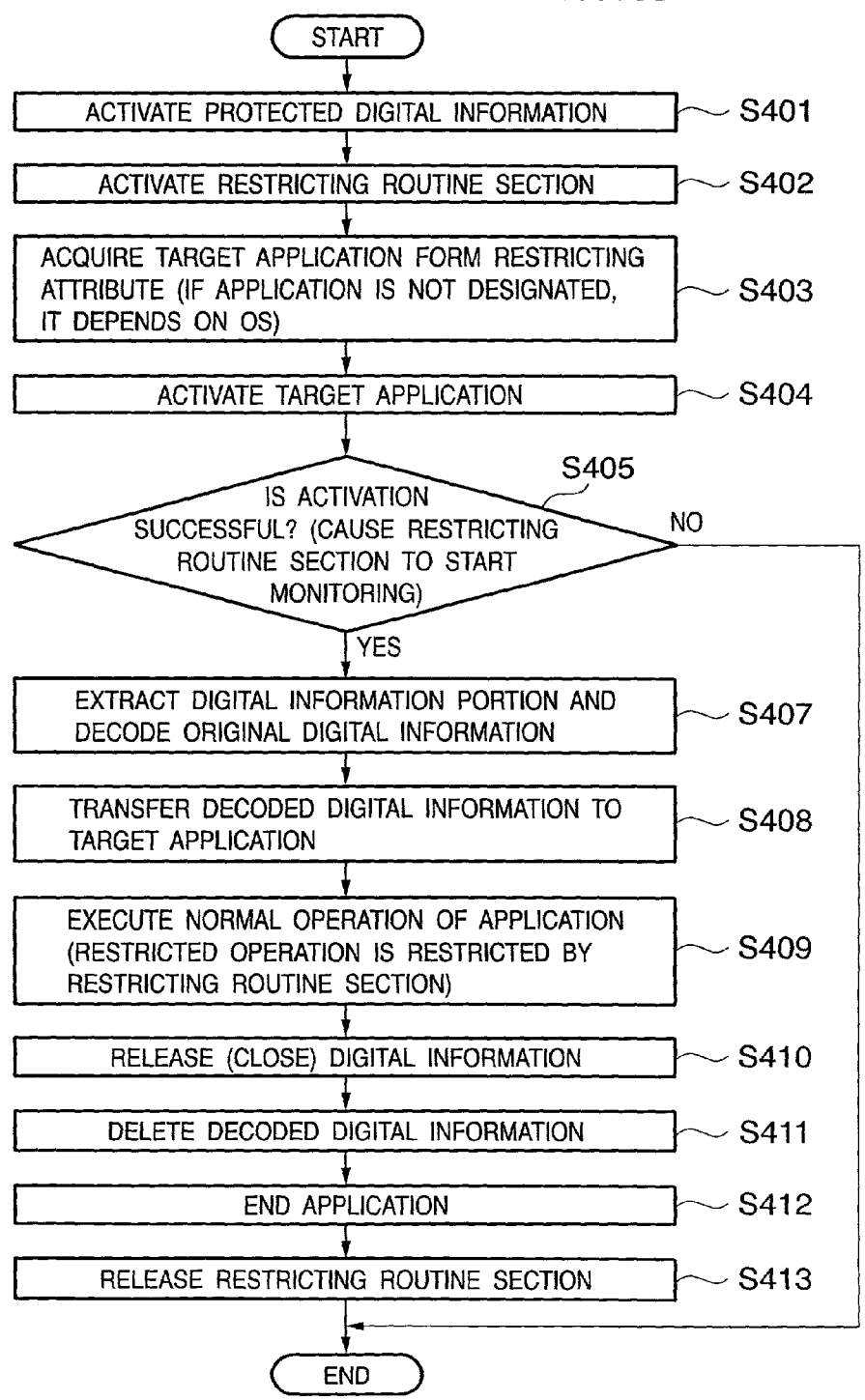
FIG. 15 is a flow chart showing a protected digital information using procedure according to the third embodiment of the present invention.

FIG. 15 is a flow chart showing a protected digital information using procedure according to the third embodiment.

Although the protected digital information 320 has a format executable in the user environment, processes in executing the protected digital information 320 is executed by the program codes in the expansion routine section 3210 of the restricting program 321. This flow chart explains the flow of the expansion routine section.

The restricting program 321 contains the restricting routine section 3211 in addition to the expansion routine section 3210. The restricting routine section 3211 is formed from program codes (resource management program 203 of the first embodiment) for controlling access from an application, and details are the same as described in the first embodiment.

In step S401, the protected digital information 320 is activated. The activation method is different from each of the user environment. For example, an OS activates it as an execution file, or a Web browser activates it as a plug-in or JAVA (registered trademark of Sun Microsystems Co.) applet.

In step S402, the restricting routine section 3211 contained in the restricting program 321 is loaded to the RAM in the computer and activated.

In step S403, the restricting attribute 322 contained in the protected digital information 320 is acquired. When the application information 3220 to be activated is contained in the restricting attribute 322, the application information 3220 is acquired to specify the application that should be activated. When no application information to be activated is contained in the restricting attribute 322, the application to be activated is specified by automatic determination.

For the automatic determination, for example, a method of acquiring the application defined in the OS on the basis of the type or extension of the digital information 323 or a method of specifying the application in accordance with the use environment is available.

In addition, restricted operations and restricting conditions contained in the restricting attribute 322 are acquired and transferred to the restricting routine section 3211 activated in step S402.

In step S404, the application specified in step S403 is activated.

In step S405, it is determined whether the application is successfully activated in step S403. If the application is successfully activated (YES in step S405), the flow advances to step S407. From step S407, the restricting routine section 3211 activated in step S402 starts monitoring access of the application, so the operation of the application can be controlled from this time.

If the application activation has failed in step S403 (NO in step S405), execution of the protected digital information 320 is ended.

In ending execution of the protected digital information 320, the restricting routine section 3211 activated in step S402 may be ended in step S413.

If the restricting routine section 3211 is not ended, and the same restricting routine section 3211 is to be activated at the next time of activation of the protected digital information 320, the activation becomes faster. Whether step S413 is to be executed when the application activation has failed in step S403 is selected in accordance with the use environment.

When the application is successfully activated, the original digital information 323 contained in the protected digital information 320 is extracted and decoded to a state accessible from the application in step S407. For example, if the application is to access a file format, a file format is output. When the information is decoded into the same format as that of the original digital information, the application is allowed to access it.

If the digital information 323 has been encrypted in step S30, the digital information 323 is also decrypted in step S407.

In step S408, the digital information decoded in step S407 is transferred to the application activated in step S404.

In step S409, the application is in condition under normal access to the digital information 323. However, since access is controlled by the restricting routine section 3211, the digital information 323 can be used only within the restriction range defined by the restricting attribute 322. That is, if the user attempts to do operation inhibited by protection, the operation is denied by the restricting routine section 3211. The operation may be permitted by charging.

In step S410, the application releases the digital information 320. Generally, when usage of the digital information 320 is ended, the application releases the digital information that will not be used. For digital information having a file format, the release may also be called "close".

In step S411, triggered by the release of the digital information 320 from the application in step S410, the digital information 320 decoded in step S407 is deleted.

In step S412, the application is ended.

In step S413, triggered by the end of the application in step S412, the restricting routine section 3211 activated in step S402 is ended and released from the computer.

In steps S411 and S413, the activated protected digital information 320 is released and deleted while the application is using the original digital information. These processes can be omitted. Even when they are omitted, operations on the target digital information can be restricted. When the processing operations are performed, no traces of the original digital information remain as an advantage. In addition, another advantage that the resources on the computer can be saved.

A specific example of the third embodiment will be described next.

Figure 16:
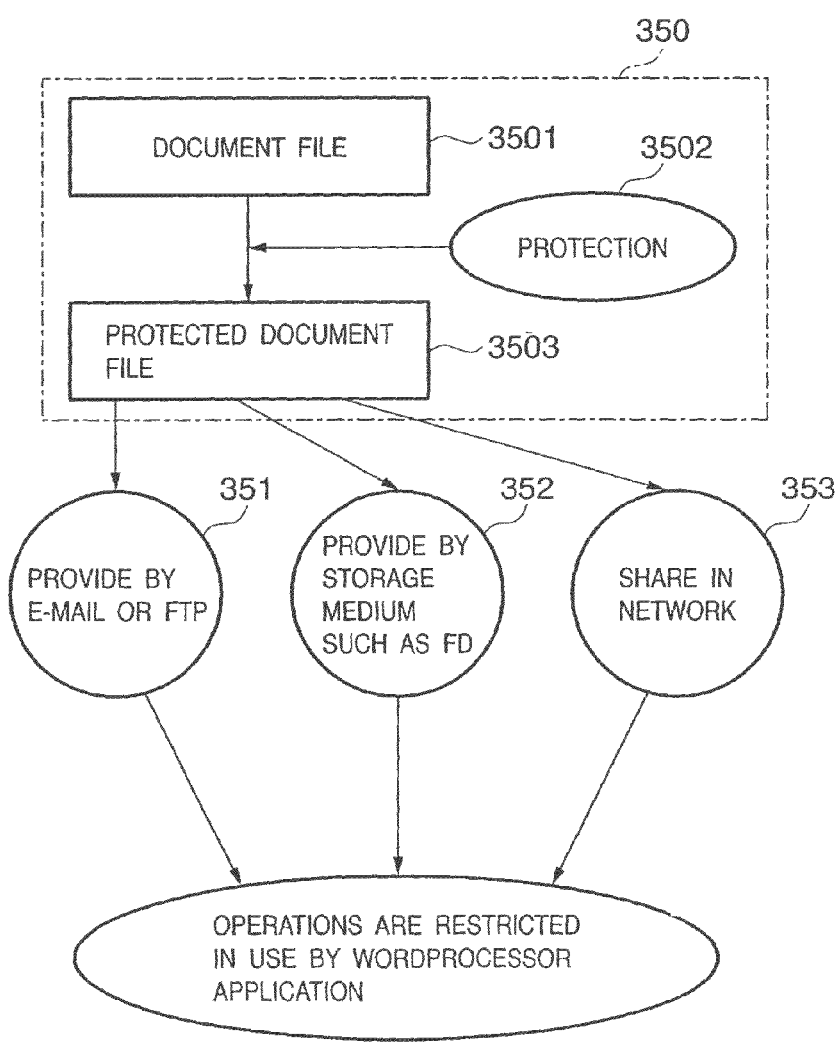
FIG. 16 is a view showing a detailed example of providing digital information having a file format in the third embodiment of the present invention.

FIG. 16 is a view showing a detailed example of providing digital information having a file format. As digital information, a document file to be used by word processor software will be exemplified here.

On a side (350) that provides a document file, a document file (3501) to be provided with restrictions is protected (3502) to create a protected document file (3503). This protected document file (3503) is provided to the user side, thereby restricting user-side operations on the document file.

As a providing means, a method (351) of providing a file using software for transferring a file, such as e-mail software or FTP software, a method (352) of copying a file to a recordable and detachable medium such as a floppy disk or CD-R/RW to provide a file, or a method (353) of providing a file using a network such as a LAN or public line or using a remote file system can be used.

In either method, the protected document file 3503 is provided to the user side without changing its file format. The provided protected document file 3503 has a format executable in the computer on the user side. When the document file is executed, word processor software to access the digital information is invocated, and the target digital information can be used by the word processor software by the above-described method. In addition, during use, access from the word processor software is controlled by the restricting routine section, and any inhibited operation is denied.

For example, in case of printing, editing, and transferring of a document are inhibited to permit only browse, and if the word-processor software has functions that should be inhibited, it is possible to designate above mentioned operations as inhibited operations by adding control program codes for them in the restricting routine section.

To restrict the usable time, user, and usable place, these conditions are designated as restricting conditions.

When charging information is designated as a restricting condition, it becomes possible to charge the user for browsing the document file.

This example is effective when a document file subjected to copyright protection is provided, or a document file is provided to only a specific person.

Figure 17:
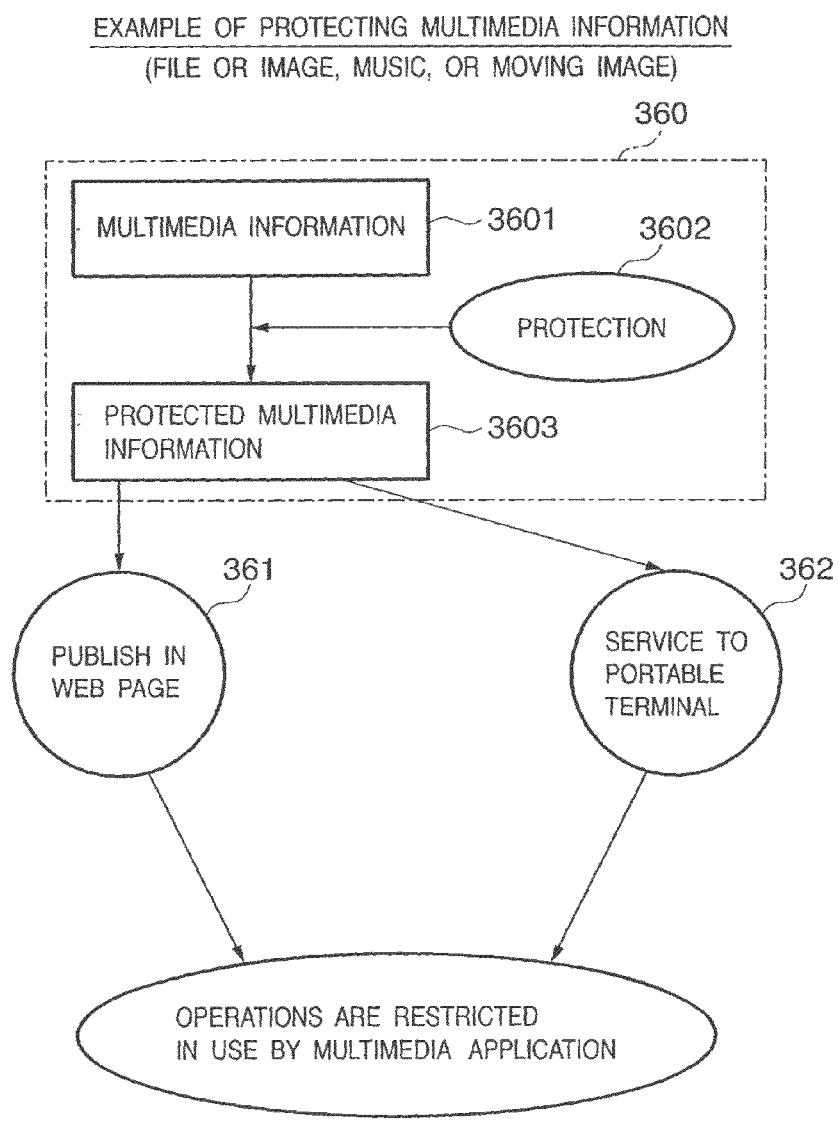
FIG. 17 is a view showing a detailed example of providing multimedia information in the third embodiment of the present invention.

FIG. 17 is a view showing a detailed example of providing digital information other then information having a file format. As digital information, multimedia information such as an image, music, or moving image will be exemplified here.

On a side (360) that provides multimedia information, multimedia information (3601) to be provided with restrictions is protected (3602) to create protected multimedia information (3603), and this protected multimedia information (3603) is provided to the user side, thereby restricting user-side operations on the multimedia information.

As a providing means, a method (361) of providing multimedia information applying a Web system, or a method (362) of providing multimedia information applying a service using a mobile terminal such as a cellular telephone can be used.

In either method, the protected multimedia information 3603 is provided to the user side through a communication network as communication data. The provided protected multimedia information 3603 has a format executable by the Web browser running on the computer or on the OS of the portable terminal on the user side. When the protected multimedia information 3603 is executed, multimedia software to access the multimedia information is executed, and the target digital information can be used by the multimedia software according to the above-described method. In addition, during use, access from the multimedia software is controlled by the restricting routine section, and any inhibited operation is denied.

Examples of formats executable on a Web browser or portable terminal are a JAVA applet or a format executed by a specific plug-ins. That is, the protected multimedia information 3603 only needs to have a format that can be executed on the platform of the user side and activated by the target application.

For example, in case of printing, editing, and transfer of multimedia information are inhibited to permit only browse, and if the multimedia software has functions that should be inhibited, it is possible to designate above mentioned operations as inhibited operations by adding control program codes for them in the restricting routine section.

To restrict the usable time, user, and usable place, these conditions are designated as restricting conditions.

When charging information is designated as a restricting condition, it becomes possible to charge the user for browsing the multimedia information.

This example is effective when multimedia information that is difficult to provide as a file format, as in a case wherein live performance information is provided in real time, is provided, or chargeable multimedia information is provided to many unspecified persons using a Web system.

As described above, according to the third embodiment, even in an environment where no security is ensured in advance, a desired security can be ensured as needed by generating protected digital information.

The pieces of protected digital information described in the third embodiment are mere examples, and any other protected digital information can be used as long as it has a format executable in accordance with the user environment of the digital information. In addition, the present invention can easily cope with a case wherein the OS or platform is changed by upgrading. Furthermore, the restricted operations can be extended within the range of the functions of the restricting program.

The examples of the digital information to be protected are not limited to the above examples, and restrictions can be placed on any other digital information if protection method can be applied.

The protecting program of the present invention can be installed or loaded to a computer through various kinds of media such as a disk type storage represented by a CD-ROM, a semiconductor memory, or a communication network. The protecting program can also be provided to a computer user as an independent product.

Fourth Embodiment

Figure 18:
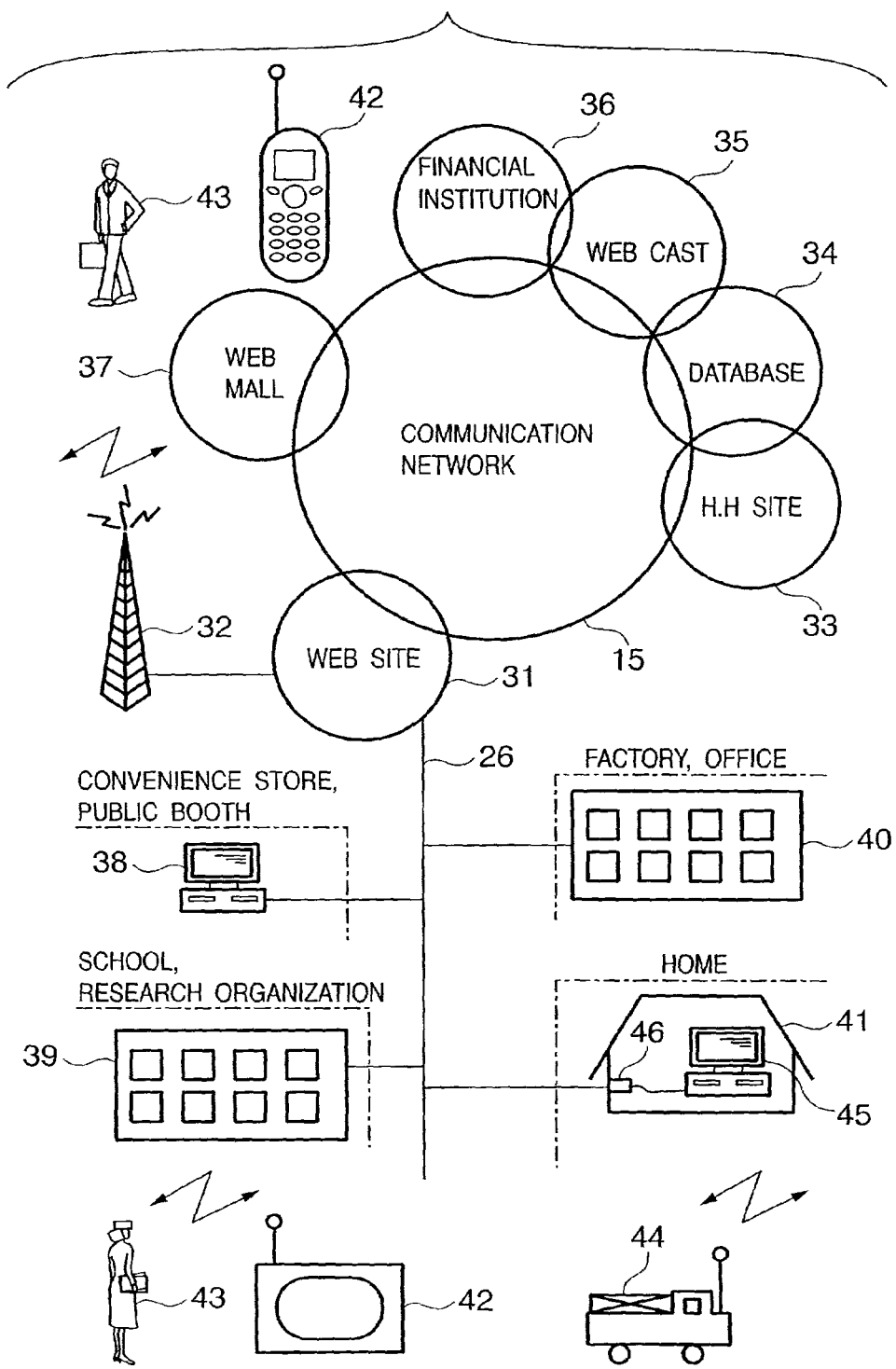
FIG. 18 is a view showing a system configuration according to the fourth embodiment of the present invention.

In the fourth embodiment, application examples of the first to third embodiments will be described. Especially, in the fourth embodiment, the first to third embodiments are applied to a wide-area communication network such as the Internet. FIG. 18 is a view showing a system configuration according to the fourth embodiment.

A communication network 15 is a public network which uses an Internet IP, telephone network PSTN, XDSL network, digital network ISDN, B-ISDN, ATM, mobile network, satellite network, and the like.

Reference numeral 31 denotes an official Web site, and an example is an i-mode site of NTT DoCoMo. In the fourth embodiment, an antenna 32 of a mobile radio network is connected to an i-mode site. A PHS or PDC (Personal Digital Cellular) can also be used. Especially, IMT 2000 is fast and therefore excellent in transmitting a moving image.

An H.H site 33 having a server (to be referred to as an H.H server hereinafter) described in the second embodiment provides various kinds of information. This H.H site 33 is a system that ensures security and sets restrictions in accordance with the right of each client, as described above. The H.H site uses a server in which software that implements an SCM 19 described above is installed.

A database site 34 stores information necessary for various kinds of businesses and researches and fan be used through the H.H site 33. In a Web cast 35, digital broadcasting can be used through the H.H site. Reference numeral 36 denotes a site of a financial institution such as a bank or credit company, which collects a charge for use of the H.H site 33.

In a mall 37 built on the Web, shopping through the H.H site 33 is possible. Payment for a purchased article is done from the site 36 of the financial institution.

When a user is charged for purchase of goods or digital broadcasting on the Web, the user, i.e., the client, and the service provider can use the system without any anxiety because perfect security is guaranteed through the H.H site 33.

38 shows an example of a state wherein a terminal device for a user is installed in a convenience store, street, or park. A printer, copying machine, and the like are connected, although they are not illustrated. Reference numeral 39 denotes a school or research organization; and 40, a factory or office, in each of which a terminal device for a user of the H.H site 33 is installed.

Reference numeral 41 denotes an example of installation of a terminal device for a user of the H.H site 33 at ordinary home; and 45, a home server. In recent years, the number of persons who work at home is increasing. This is a benefit of development of communication lines. When such a user utilizes data or information in an office, the present invention demonstrates its security effect. Reference numeral 46 denotes a home router.

A portable information terminal device 42 is also called a mobile device. Proliferation of the portable information terminal device 42 is conspicuous, and particularly, the i-mode has quickly penetrated the society. The portable information terminal device 42 can transmit e-mail to the browser of CHTML and thus conveniently access the H.H site 33. In addition, a PDA (portable information terminal device) is also convenient to use, as can be seen from a PalmOS (registered by Palm Computing, Inc). A PDA can also have or connect a printer, Internet camera, or digital camera.

Reference numeral 43 denotes a client (user). Referring to FIG. 18, the client 43 can work anywhere. When the H.H site 33 is used, the right restricting function is as its security is exhibited. Hence the user can easily use an intranet of a company that is not illustrated.

An onboard moving body 44 can also receive a service from the H.H site 33 by using a mobile Internet.

In the fourth embodiment, an H.H server is implemented in the H.H site 33. However, the server can be implemented on the Web site 31. When the protecting program for creating protected digital information according to the third embodiment is used, the server is implemented on, e.g., the H.H site 33 or Web site 31 and used by a user as needed.

Fifth Embodiment

In the fifth embodiment, other practical examples of the first to third embodiments will be described. Especially, in the fifth embodiment, the first to third embodiments are applied to an intranet in a company.

Figure 19:
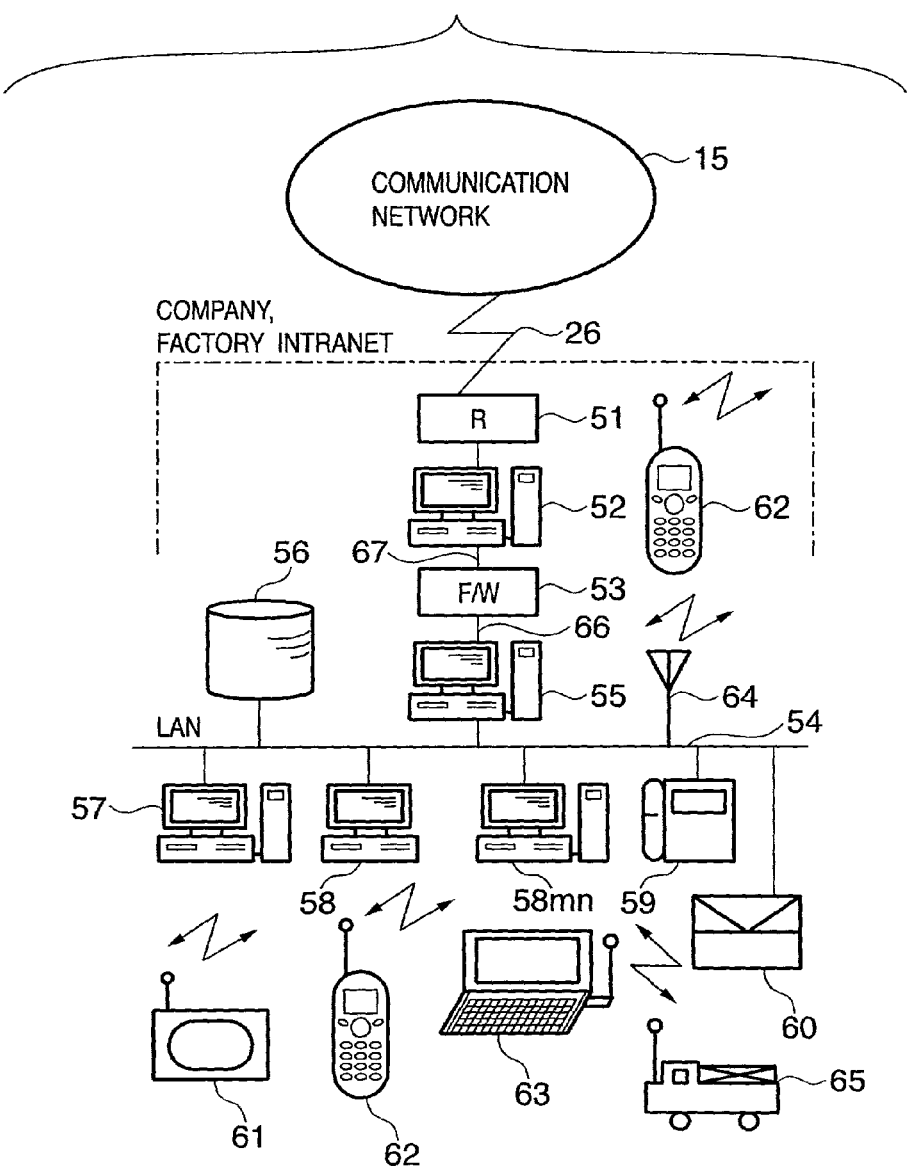
FIG. 19 is a view showing a system configuration according to the fifth embodiment of the present invention.

FIG. 19 is a view showing a system configuration according to the fifth embodiment.

The same reference numerals as in the fourth embodiment denote the same elements in FIG. 19, and a detailed description thereof will be omitted.

A communication network 15 is connected to a router 51 through a line 26. Reference numeral 52 denotes a WWW server; and 53, a firewall. The firewall (F/W) 53 is connected to an H.H server 55. A connection line 67 connects the WWW server to the F/W 53. A connection line 66 connects the F/W 53 to the H.H server 55.

A database 56 of a company is connected to the H.H server 55 through a LAN 54. The database 56 stores various kinds of data necessary for operating activities, including customer list and business information, or for a factory, technical information related to production and manufacturing and design/development information. An employee of the company as a client can use the database 56 with restrictions according to his/her right as described above. These pieces of information are classified into information usable and that unusable in accordance with the function and rank. Some pieces of information are disclosed only to representative directors, which can be managed by the H.H server 55 under appropriate restrictions.

Client PCs and server 57, 58, and 58 nm in the company are connected through the LAN 54 in the office. Reference numeral 59 denotes a multi-functional telephone; 60, a printer or facsimile apparatus/copying machine; 61, a portable information terminal device (e.g., a PDA); 62, a portable telephone; and 63, a mobile notebook PC. These devices are used as internal mobile devices in the company or on its premises. Reference numeral 65 denotes an internal mobile onboard terminal on the premises; and 64, an antenna for internal mobile terminal devices in the company or on its premises.

This intranet can be used not only in a company but also in a corporate, research organization, or educational organization, and can be accessed from outside the company. For external use, internal information can be provided while ensuring security. Hence, the system of the present invention is very effective.

In the fifth embodiment, the H.H server 55 is formed in the intranet. However, the security function realized by the H.H server 55 may be formed on a client on the office LAN 54. When the protecting program for creating protected digital information according to the third embodiment is used, the function is implemented on, e.g., the H.H server 55 and used by a user as needed.

Sixth Embodiment

In the sixth embodiment, other practical examples of the first to third embodiments will be described. Especially, in the sixth embodiment, the first to third embodiments are applied to an end user environment such as SOHO.

Figure 20:
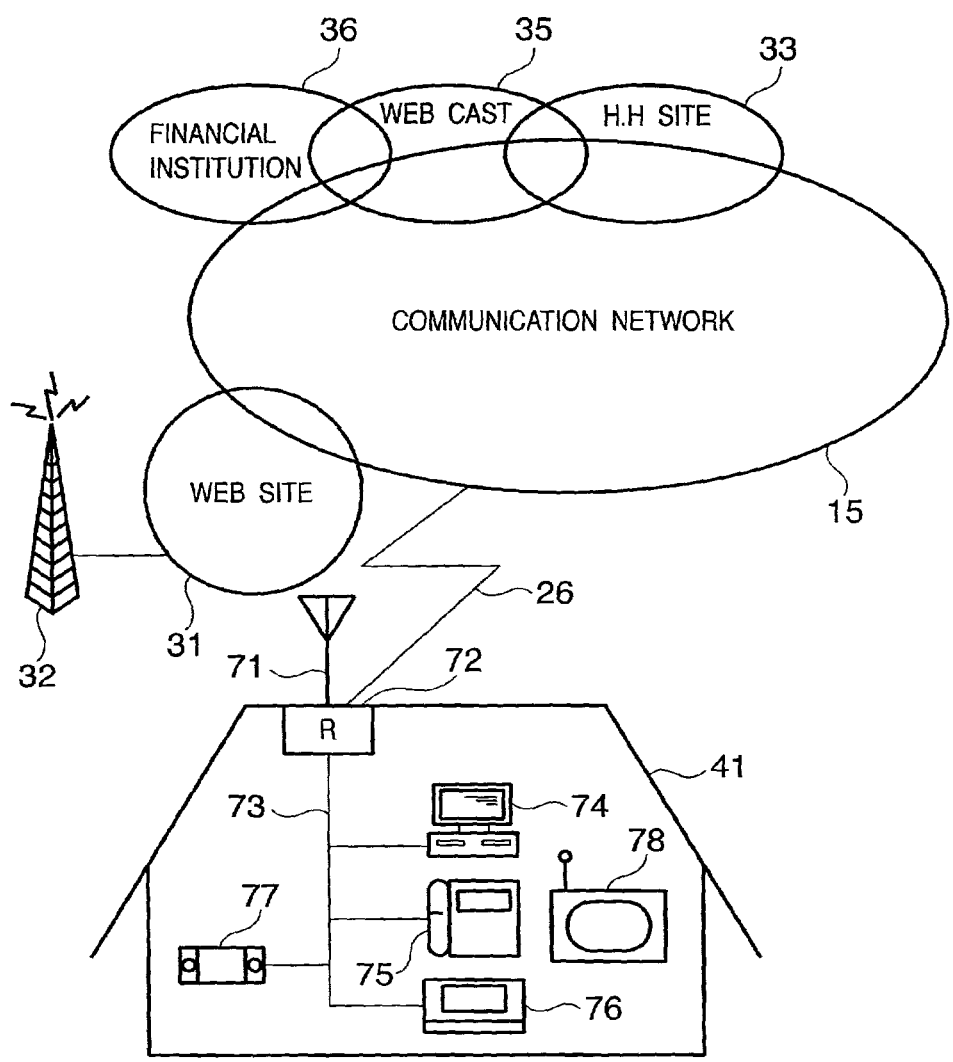
FIG. 20 is a view showing a system configuration according to the sixth embodiment of the present invention.

FIG. 20 is a view showing a system configuration according to the sixth embodiment.

The same reference numerals as in the fourth embodiment denote the same elements in FIG. 20, and a detailed description thereof will be omitted.

As described above, the number of homeworkers is increasing along with the proliferation of IT. Even in Japan, the number of homeworkers is said to have already exceeded 6 million. This tendency is becoming strong as the society becomes aging and the birthrate decreases.

Referring to FIG. 20, a house 41 with an end user is connected to a public line 26 through a home router 72. The home router 72 is connected to a home LAN 73. The home LAN 73 may be not a wired LAN but a radio LAN using Bluetooth or IrDA. Reference numeral 74—denotes a PC or home server; 75, a multi-functional telephone with a wide screen; 76, a TV; 77, an AV device; 78, a portable information terminal device; 71, an antenna connected to a public radio network; and 41, a house or home.

Since teleworking employee handles various kinds of business information and confidential information, it is most important to ensure security. In the sixth embodiment, it is safety because information is transmitted from an official Web site 31 through an H.H site 33. An environment for receiving contents not as business but as an entertainment from the network has also been prepared. Since a TV program or music distributed from a Web cast 35 can be browsed or listened to using the TV terminal 76, AV device 77, or portable information terminal device 78, the user can live in comfort.

When chargeable entertainment contents are received from a site on the network, the user must pay a fee. In this case, when, e.g., a credit card number is input using the H.H site 33, the rent fee can be automatically paid. In this case, to prevent disguise, personal authentication is necessary. Various personal authentication methods have been proposed. In addition to an ID number or telephone number, a public key may be used to improve the degree of secret. Note that an H.H server may be installed in the home server 74 to ensure security. When a user is a homeworker who belongs to an organization, such a condition may be imposed that the home server 74 offered by the company is used for teleworking.

When the protecting program for creating protected digital information according to the third embodiment is used, the function is implemented on, e.g., the H.H site 33 or Web site 31 and used by a user as needed.

The flow of ensuring security and the flow of imposing restrictions and charging the user or client in the sixth embodiment will be described next.

Figure 21:
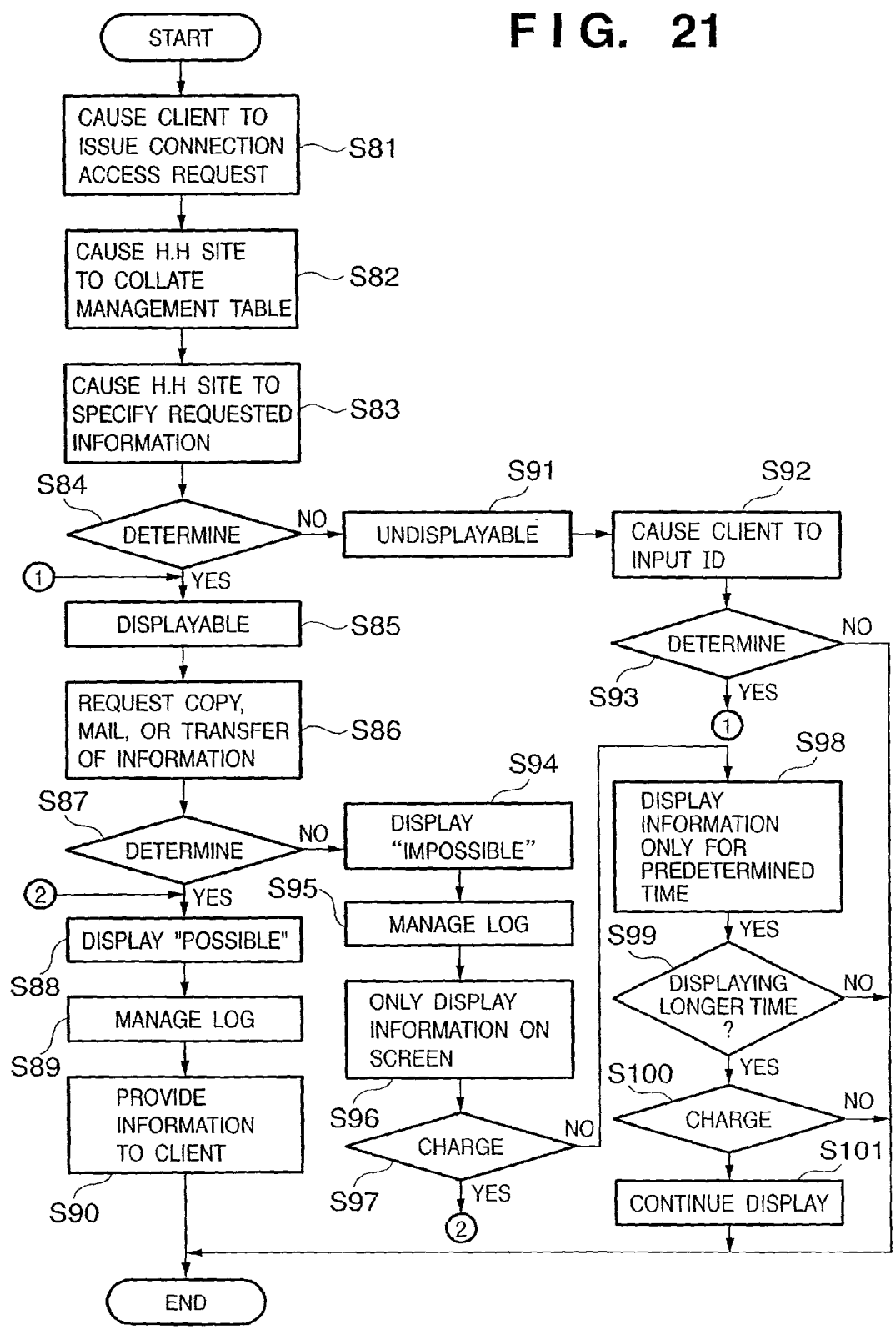
FIG. 21 is a flow chart showing a process of imposing restrictions and charging a user or client.

FIG. 21 is a flow chart for implementing the sixth embodiment.

Referring to FIG. 21, for the descriptive convenience, the flow will be described as processing between the H.H site 33 and a client who accesses the H.H site 33 under the management by the H.H server. However, the processing may be realized as processing between the H.H server and a client on a communication network 15. In step S81, the client accesses the H.H site 33 to obtain information. In step S82, the H.H site 33 searches for and collates the personal information of the client who has made the access.

In step S83, the information from the client is specified. As a characteristic feature, in "specifying information" here, the information is restricted by the degree of secret and the right according to the post of the client who is accessing. For a client or user who belongs to an organization, the post can be automatically discriminated. Since access from a general user is also possible, information that can be provided is distinguished from information that cannot. In addition to free information such as catalogs or advertisements of a company, there are also pay information for distribution. When valuable and chargeable information is distributed while changing the degree of charging, the H.H site 33 is built as a business.

In step S84, it is determined whether the H.H site 33 can meet the requirement of the client who is accessing the H.H site 33.

If it is determined in step S84 that the information can be provided to the client, an acknowledgement is returned or displayed in step S85. Next, in step S86, for example, the client requests copy of the requested information and transfer to the third party by e-mail. In step S87, the duty and right of the client are determined by the H.H site 33. As described above, in the present invention, use of information is restricted on the basis of the right of an individual.

If it is determined that the request from the client is to be accepted, a message representing that copy and mail transfer are possible is displayed on the client's screen in step S88. The request is accepted, e.g., when the client has a higher rank right, or the degree of secret of the requested information is low.

In step S89, when and which information or a document the client has copied or transferred by e-mail are recorded in the H.H server 33 as a log.

In step S90, since log management in the H.H server 33 is ended, and conditions for requested information providing are satisfied, the requested information is provided to the client.

On the other hand, if it is determined in step S84 that the information cannot be provided to the client, a message representing that the request from the client is denied is sent in step S91. In step S92, the client inputs, as an ID number, a telephone number, insurance card number, license number, annuity number, or the like. A client who is required to input such an ID number is assumed to be a client who has accessed the H.H site 33 for the first time or a general client who does not use the H.H site 33.

In step S93, the H.H site 33 determines on the basis of the input ID number whether subsequent processing can be executed. If execution is to be denied, the processing is ended. On the other hand, the execution is to be permitted, the flow advances to step S85, If the information can be provided upon payment, the client is notified of the amount of charge. The value of information or a document changes depending on its degree of secret or importance, and so does the amount of charge.

That is, step S93 assumes a case wherein the information does not require charging as a disclosure condition, a case wherein the client wants no chargeable information, or a case wherein the client wants the information depending on the amount of charge. If acquisition can be permitted, the flow advances to step S85. Otherwise, the processing is ended.

On the other hand, if it is determined in step S87 that the request from the client cannot be accepted, the flow advances to step S94. In step S94, although it is determined in step S87 that copy and e-mail transfer of the desired information or document are impossible, browsing the information or document on the client's screen is permitted, and such display is output to the client's screen. For this reason, although the information to be browsed is sent to the client, the information is controlled by the H.H site 33, and therefore, copy and e-mail transfer of the information cannot be executed even when it is displayed on the client's screen.

In step S95, the above-described log is managed in the H.H site 33. In step S96, the requested information is displayed on the client's screen. Assume that the client still wants copy or e-mail transfer of the information. In this case, the client can newly send a permission request to the site or server. That is, the client makes an application to provide chargeable information in step S97. In this step, since the duty and rank of the client have been recognized by the H.H site 33, providing the information may be permitted depending on the amount of charge.

When the H.H site 33 determines that the information can be provided by charging, an amount is presented. When the H.H site 33 determines that the information cannot be provided even by charging, this processing is ended in step S98 only with display on the client's screen. The display time may be restricted in accordance with the importance of information or a document. After display within a predetermined time, a charging system may be introduced for longer display.

In this case, in steps S99 and S100, the H.H site 33 inquires the client or user about the presence/absence of longer display and charging. When the H.H site 33 and client acknowledge, screen display is executed for a longer time in step S101.

If charging by the H.H site 33 and acknowledgement of the client are not obtained, this processing is ended with display only for the predetermined time.

As described above, in the first embodiment, an example in which any illicit activity is prevented by restricting the access right of a client without revising the OS or process has been described. In the second embodiment, system configuration of the H.H. server has been described. In the third embodiment, an arrangement in which the security environment realized in the first embodiment is provided to an arbitrary user has been described.

In the fourth embodiment, an H.H site system configuration that exhibits an effect in a social environment mainly in a communication network, and more particularly, in the Internet has been described.

In the fifth embodiment, a case wherein the H.H site is applied to an intranet in a company, factory, school, research organization, group, or the like has been described. In the sixth embodiment, a case wherein the H.H site is applied to a home office or teleworking has been described.

Although the flow chart shown in FIG. 21 explains browse, copy, and e-mail transfer of information or a document through the H.H server or site, it can also be applied to digital broadcasting distribution from the Web cast and a charging system for distribution from various kinds of free/chargeable contents described with reference to FIG. 18.

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magneto-optical disk, CD-ROM, CD-R/RW, DVD-ROM/RAM, magnetic tape, nonvolatile memory card, ROM, or the like can be used.

The functions of the above-described embodiments are implemented not only when the readout program codes are executed by the computer but also when the OS running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the medium, the storage medium stores program codes corresponding to the above-described flow charts.

As is apparent from the above description, in the present invention, basically, an operation request from a process or OS for computer resource(s) managed by the OS, such as a file, network, storage device, display screen, or external device is trapped before access to the computer resource. Next, the presence/absence of an access right to the computer resource designated by the trapped operation request is determined. If it is determined that an access right is present, the operation request is transferred to the OS, and the result is returned to the request source process. If no access right is present, the operation request is denied. With this arrangement, for a user who has no access right, operation of resources including computer resource(s) other than files and screen can be restricted without revising the OS or process (program such as an application or demon that runs on the OS).

In addition, only by installing the resource management program in the existing environment, various kinds of illicit accesses described above can be restricted, and the range of the existing access right can be extended.

Furthermore, only by installing the resource restricting program in the existing environment, various kinds of illicit accesses can be restricted, and the range of the existing access right can be extended.

Those programs can also cope with even an application having no function of coping with an access denial.

When the right restricting system of the present invention is applied to e-business that is rapidly progressing, illicit access prevention and charging for distribution of various kinds of chargeable contents can be effectively done. Along with the rapid arrival of an aging society, teleworking also becomes an important problem.

When the H.H system is introduced, a document, data, or information in a company can be safely extracted at home, and the homeworking result can be sent to a Web site or company.

When a restricting program and restricting attribute are added to digital information to protect it, and the protected digital information is used, operations on the digital information can be restricted.

When the restricting program has a format executable on the computer on the digital information receiving side, the restricting program needs not be installed in advance in the existing environment on the receiving side, various kinds of illicit accesses as described above can be restricted, and the range of the existing access right can be extended.

In addition, the restricting program can deal with even an application having no function of coping with an access denial.

In providing digital information for which the use range is to be restricted for the purpose of, e.g., copyright protection, when protected digital information is provided, the use range on the receiving side can be restricted.

As many apparently widely different embodiments of the present invention can be made without departing from the spirit and scope thereof, it is to be understood that the invention is not restricted to the specific embodiments thereof except as defined in the appended claims.

What is claimed is:

1. An information processing apparatus for converting digital information to restrict operations, the apparatus comprising a computer processor and memory cooperating to function as:
   a storage unit reading and storing the digital information;
   a first adding unit adding restricting attribute information to the digital information, wherein the restricting attribute information includes restricted operation information for defining contents of an operation restriction on the digital information and restricting condition information for defining conditions for applying the operation restriction on the digital information;
   a second adding unit adding a restricting program to the digital information, wherein the restricting program monitors and controls one or more operations on the digital information;
   an output unit outputting the digital information to which the restricting attribute information and the restricting program are added by the first and second adding units all together as data having an executable format, in order to apply the operation restriction on the digital information according to the restricting attribute information; and a transmission unit transmitting the data having the executable format to an other terminal, wherein said restricting program is transmitted to the other terminal with the data having the executable format, and wherein execution of said restricting program deletes the digital information of said data in response to an application activated by the other terminal releasing the digital information of said data after use of the digital information of said data by the application has ended.

2. An information processing method of converting digital information to restrict operations, the method being performed, at least in part, by an information processing apparatus including a central processing unit, the method comprising:

reading and storing the digital information;

adding restricting attribute information to the digital information, wherein the restricting attribute information includes restricted operation information for defining contents of an operation restriction on the digital information and restricting condition information for defining conditions for applying the operation restriction on the digital information;

adding a restricting program to the digital information, wherein the restricting program monitors and controls one or more operations on the digital information;

outputting the digital information to which the restricting attribute information and the restricting program are added all together as data having an executable format, wherein the outputting is performed, at least in part, by the central processing unit, in order to apply the operation restriction on the digital information according to the restricting attribute information; and transmitting the data having the executable format to an other terminal, wherein the restricting program is transmitted to the other terminal with the data having the executable format, and wherein execution of the restricting program deletes the digital information of said data in response to an application activated by the other terminal releasing the digital information of said data after use of the digital information of said data by the application has ended.

3. An information processing system including first and second terminals connected through a communication network, wherein the first terminal comprises:

a storage unit reading and storing digital information;

a first adding unit adding restricting attribute information to the digital information, wherein the restricting attribute information includes restricted operation information for defining contents of an operation restriction on the digital information and restricting condition information for defining conditions for applying the operation restriction on the digital information;

a second adding unit adding a restricting program to the digital information, wherein the restricting program monitors and controls one or more operations on the digital information;

an output unit outputting the digital information to which the restricting attribute information and the restricting program are added by the first and second adding units all together as data having an executable format, in order to apply the operation restriction on the digital information according to the restricting attribute information; and a transmission unit transmitting the data having the executable format to the second terminal, wherein said restricting program is transmitted to the second terminal with the data having the executable format, and wherein execution of said restricting program deletes the digital information of said data in response to an application activated by the second terminal releasing the digital information of said data after use of the digital information of said data by the application has ended, and the second terminal comprises:

a reception unit receiving the data having the executable format from the first terminal;

an activation unit activating the data having the executable format;

a read unit reading a restricting routine section monitoring and controlling one or more operations on the digital information of said data from the restricting program and activating the restricting routine section;

an acquisition unit acquiring a target application to operate the digital information of said data from the restricting attribute information;

an application activation unit activating the target application acquired by the acquisition unit;

a determination unit determining whether the target application has been successfully activated by the application activation unit;

an end unit ending activation of the data having the executable format, when the determination unit determines that activation of the target application has failed;

an operation unit decoding the digital information of said data into a state operable by the target application, when the determination unit determines that the target application has been successfully activated; and a processing unit transferring the decoded digital information of said data to the target application.

4. A non-transitory computer-readable storage medium storing a computer-executable program that, when executed by a computer, causes the computer to perform an information processing method of converting digital information to restrict operations, the method comprising:

reading and storing the digital information;

adding restricting attribute information to the digital information, wherein the restricting attribute information includes restricted operation information for defining contents of an operation restriction on the digital information and restricting condition information for defining conditions for applying the operation restriction on the digital information;

adding a restricting program to the digital information, wherein the restricting program monitors and controls one or more operations on the digital information;

outputting the digital information to which the restricting attribute information and the restricting program are added all together as data having an executable format, in order to apply the operation restriction on the digital information according to the restricting attribute information; and transmitting the data having the executable format to an other terminal, wherein said restricting program is transmitted to the other terminal with the data having the executable format, wherein execution of said restricting program deletes the digital information of said data in response to an application activated by the other terminal releasing the digital information of said data after use of the digital information of said data by the application has ended.

* * * * *